(12) United States Patent
Tamura et al.

(10) Patent No.: US 10,597,478 B2
(45) Date of Patent: Mar. 24, 2020

(54) COMPOSITION FOR PREPARING OPTICAL FUNCTIONAL LAYER, OPTICAL FILM, AND LIQUID CRYSTAL DISPLAY DEVICE

(71) Applicant: FUJIFILM Corporation, Tokyo (JP)

(72) Inventors: Akio Tamura, Kanagawa (JP); Nobuyuki Akutagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 38 days.

(21) Appl. No.: 16/000,288

(22) Filed: Jun. 5, 2018

(65) Prior Publication Data

US 2018/0282463 A1 Oct. 4, 2018

Related U.S. Application Data

(63) Continuation of application No. PCT/JP2016/005082, filed on Dec. 8, 2016.

(30) Foreign Application Priority Data

Dec. 11, 2015 (JP) .................... 2015-241909

(51) Int. Cl.

| | | |
|---|---|---|
| *C08F 220/22* | (2006.01) | |
| *C08F 218/10* | (2006.01) | |
| *C08F 216/14* | (2006.01) | |
| *C09D 127/12* | (2006.01) | |
| *C09D 157/10* | (2006.01) | |
| *C08F 290/06* | (2006.01) | |
| *G02B 5/30* | (2006.01) | |
| *G02B 1/14* | (2015.01) | |
| *C09D 131/02* | (2006.01) | |
| *C09D 129/10* | (2006.01) | |
| *C08F 218/08* | (2006.01) | |
| *C08F 263/04* | (2006.01) | |
| *C08F 265/06* | (2006.01) | |
| *C09D 4/00* | (2006.01) | |
| *C09D 151/00* | (2006.01) | |

(Continued)

(52) U.S. Cl.
CPC ...... *C08F 290/06* (2013.01); *C08F 216/1408* (2013.01); *C08F 218/08* (2013.01); *C08F 218/10* (2013.01); *C08F 220/22* (2013.01); *C08F 263/04* (2013.01); *C08F 265/06* (2013.01); *C08F 283/02* (2013.01); *C08L 101/12* (2013.01); *C09D 4/00* (2013.01); *C09D 127/12* (2013.01); *C09D 129/04* (2013.01); *C09D 129/10* (2013.01); *C09D 131/02* (2013.01); *C09D 133/16* (2013.01); *C09D 151/003* (2013.01); *C09D 157/10* (2013.01); *C09D 183/04* (2013.01); *G02B 1/14* (2015.01); *G02B 5/30* (2013.01); *G02F 2001/133543* (2013.01); *G02F 2001/133614* (2013.01)

(58) Field of Classification Search
CPC ... C09D 133/16; C09D 127/12; C08F 218/08; C08F 218/04; C08F 218/06; C08F 218/10
See application file for complete search history.

(56) References Cited

U.S. PATENT DOCUMENTS 5,011,623 A 4/1991 Yoshinaga et al.
2003/0228537 A1 12/2003 Yoon et al.
(Continued)

FOREIGN PATENT DOCUMENTS

GB 1439677 A 6/1976
JP 49-017222 A 2/1974
(Continued)

OTHER PUBLICATIONS

Office Action, issued by the Japanese Patent Office dated Feb. 19, 2019, in connection with Japanese Patent Application No. 2017-554794.
(Continued)

*Primary Examiner* — Jeffrey C Mullis
(74) *Attorney, Agent, or Firm* — Edwards Neils LLC; Jean C. Edwards, Esq.

(57) ABSTRACT

A composition for preparing an optical functional layer capable of forming an optical film having an excellent surface condition and excellent lamination properties with another layer, includes a liquid crystal compound and a copolymer, and the copolymer includes a constitutional unit corresponding to a fluoroaliphatic group-containing monomer represented by Formula I, and a constitutional unit corresponding to a monomer represented by Formula II. In Formulae I and II, $R^1$, $R^{10}$, and $R^3$ each independently represent a hydrogen atom or an alkyl group having 1 to 20 carbon atoms, $R^2$ represents an alkyl group having 1 to 20 carbon atoms in which at least one carbon atom has a fluorine atom as a substituent, and L represents a divalent linking group constituted by at least one selected from the group consisting of —O—, —(C=O)O—, —O(C=O)—, a divalent chain group, and a divalent aliphatic cyclic group.

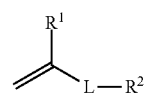

Formula I

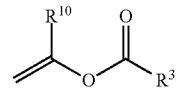

Formula II

10 Claims, 3 Drawing Sheets

(51) Int. Cl.
*C08F 283/02* (2006.01)
*C08L 101/12* (2006.01)
*C09D 129/04* (2006.01)
*C09D 133/16* (2006.01)
*C09D 183/04* (2006.01)
*G02F 1/1335* (2006.01)

(56) References Cited

U.S. PATENT DOCUMENTS

2006/0035037 A1* 2/2006 Yoshizawa ............. C09K 19/32
                                                              428/1.1
2007/0164255 A1   7/2007 Seki et al.
2010/0157180 A1*  6/2010 Doane ............... G02F 1/133305
                                                               349/25

FOREIGN PATENT DOCUMENTS

| JP | 53-076825 A | 7/1978 |
|----|-------------|--------|
| JP | H02-179622 A | 7/1990 |
| JP | 2000-102727 A | 4/2000 |
| JP | 2005-248116 A | 9/2005 |
| JP | 2006-104307 A | 4/2006 |
| JP | 2007-016082 A | 1/2007 |
| JP | 2007-016083 A | 1/2007 |

OTHER PUBLICATIONS

International Search Report issued in PCT/JP2016/005082 dated Mar. 21, 2017.
Written Opinion issued in PCT/JP2016/005082 dated Mar. 21, 2017.
International Preliminary Report on Patentability completed by WIPO dated Jun. 21, 2018, in connection with International Patent Application No. PCT/JP2016/005082.
Office Action, issued by the Japanese Patent Office dated May 14, 2019, in connection with Japanese Patent Application No. 2017-554794.

* cited by examiner

COMPOSITION FOR PREPARING OPTICAL FUNCTIONAL LAYER, OPTICAL FILM, AND LIQUID CRYSTAL DISPLAY DEVICE

CROSS-REFERENCE TO RELATED APPLICATIONS

This application is a continuation application of International Application No. PCT/JP2016/005082, filed Dec. 8, 2016, which was published under PCT Article 21(2) in Japanese, and which claims priority under 35 U.S.C. § 119(a) to Japanese Patent Application No. 2015-241909, filed Dec. 11, 2015. The above applications are hereby expressly incorporated by reference, in their entirety, into the present application.

BACKGROUND OF THE INVENTION

1. Field of the Invention

The present invention relates to a composition for preparing an optical functional layer, an optical film, and a liquid crystal display device.

2. Description of the Related Art

In an image display device such as a cathode ray tube display device (CRT), a plasma display (PDP), an electroluminescent display (ELD), a vacuum fluorescent display (VFD), a field-emission display (FED), and a liquid crystal display device (LCD), a hard coat film having a hard coat layer provided on a support is suitably provided to prevent scratches on a display surface.

In recent years, with the diversification of image display devices such as touch panel use or the like, there has been an increasing demand for laminating another functional layer on a hard coat layer (recoating) and a hard coat layer that is easily laminated with another layer, that is, that has excellent lamination properties with another layer (recoatability) has been required. In a case where the surface of the hard coat layer is hydrophilic and has low wettability in a case of performing recoating on a hard coat layer, deterioration in the evenness (surface smoothness) of an upper layer, such as a cissing defect (the generation of cissing coating unevenness of a coating composition) or coating thickness unevenness, occurs. On the other hand, typically, a leveling agent such as a fluorine-containing polymer is added into a hard coat layer in order to enhance the evenness of the coating film of the hard coat layer itself, and due to the hydrophobicity of the leveling agent, the surface of the hard coat layer is made hydrophobic. Thus, a trade-off between evenness of the hard coat layer and recoatability becomes a problem.

For example, JP2000-102727A discloses the use of a specific fluorine-based surfactant for the purpose of attaining even coatability with respect to a base material at the time of application and recoatability after application.

In addition, JP2005-248116A discloses a fluorine-containing polymer capable of reversibly changing the surface of a coating film from a hydrophobic surface to a hydrophilic surface according to external environments.

SUMMARY OF THE INVENTION

The present inventors have attempted that by using the polymers described in JP2000-102727A and JP2005-248116A, one optically anisotropic layer (underlayer) formed of a polymerizable discotic liquid crystal compound is formed and further, one optically anisotropic layer (upper layer) formed of a polymerizable rod-like liquid crystal compound is formed thereon. In this case, it is required that in a good coated surface condition without repelling the coating composition in the respective coating films, so-called cissing, and drying unevenness or wrinkling, further, the liquid crystal compound is aligned in the coating films in a desired alignment state. However, at the time of applying the underlayer and the upper layer, due to the hydrophobicity of the composition and the surface of the film to be formed, cissing occurs or a good surface condition cannot be obtained in some cases. On the other hand, even in a case where a good surface condition is obtained and the liquid crystal compound is aligned in a desired alignment state, cissing may occur. The same applies to a case where other commercially available fluorine-based surfactants are added. In a case where an optical functional layer including a liquid crystal compound is formed by coating in this manner, it is difficult to prevent cissing at the time of application and to improve the surface condition and alignment of the coating film.

The present invention has been made in consideration of the above-circumstances, and an object thereof is to provide a composition for preparing an optical functional layer which is less likely to cause cissing when being used in film formation by coating. Another object of the present invention is to provide a composition for preparing an optical functional layer which is less likely to cause cissing of a coating solution for forming an upper layer in a case of using an optical functional layer after preparation as an underlayer and forming an upper layer on a surface thereof by coating. Still another object of the present invention is to provide an optical film having a good surface condition and good alignment formed by using such a composition for preparing an optical functional layer, and a liquid crystal display device including the optical film.

As a result of conducting intensive investigations for achieving the above objects, the present inventors have found that the above objects can be achieved by incorporating a copolymer having a specific side chain into a composition for preparing an optical functional layer.

A composition for preparing an optical functional layer of the present invention comprises: a liquid crystal compound; and a copolymer, in which the copolymer includes a constitutional unit corresponding to a fluoroaliphatic group-containing monomer represented by Formula I, and a constitutional unit corresponding to a monomer represented by Formula II.

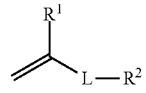

Formula I

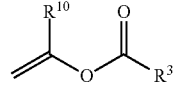

Formula II

In Formulae I and II, $R^1$, $R^{10}$, and $R^3$ each independently represent a hydrogen atom or an alkyl group having 1 to 20 carbon atoms, $R^2$ represents an alkyl group having 1 to 20 carbon atoms in which at least one carbon atom has a fluorine atom as a substituent, and L represents a divalent linking group constituted by at least one selected from the group consisting of —O—, —(C=O)O—, —O(C=O)—, a divalent chain group, and a divalent aliphatic cyclic group.

It is preferable that the fluoroaliphatic group-containing monomer represented by Formula I is a monomer represented by Formula III.

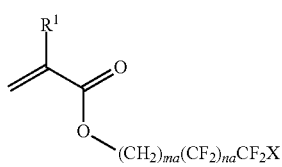

Formula III

In Formula III, $R^1$ represents a hydrogen atom or an alkyl group having 1 to 20 carbon atoms, ma and na each independently represent an integer of 1 to 10, and X represents a hydrogen atom or a fluorine atom.

It is preferable that in Formula III, ma is an integer of 1 or 2, and na is an integer of 1 to 6.

It is preferable that in Formula II, $R^3$ is a methyl group, an ethyl group, a propyl group, a t-butyl group, or a n-butyl group.

It is preferable that the liquid crystal compound is a polymerizable liquid crystal compound.

It is preferable that the polymerizable liquid crystal compound is at least one of a polymerizable rod-like liquid crystal compound or a polymerizable disk-like liquid crystal compound.

It is preferable that an optical film of the present invention includes a cholesteric liquid crystal layer formed by using the composition for preparing an optical functional layer of the present invention on a support.

It is preferable that the cholesteric liquid crystal layer is formed by laminating a plurality of layers.

It is preferable that the plurality of cholesteric liquid crystal layers has a cholesteric liquid crystal layer including a rod-like liquid crystal compound and a cholesteric liquid crystal layer including a disk-like liquid crystal compound.

It is preferable that the cholesteric liquid crystal layer including the rod-like liquid crystal compound and the cholesteric liquid crystal layer including the disk-like liquid crystal compound are in contact with each other.

A liquid crystal display device of the present invention comprises: at least a backlight unit including the optical film of the present invention; and a liquid crystal cell.

According to the present invention, a composition for preparing an optical functional layer includes a liquid crystal compound, and a copolymer, in which the copolymer includes a constitutional unit corresponding to a fluoroaliphatic group-containing monomer represented by Formula I, and a constitutional unit corresponding to a monomer represented by Formula II. The monomer represented by Formula II has a vinyl ester structure and by incorporating such a monomer into the copolymer, a film having high surface energy can be formed. Therefore, in a case where an optical functional layer such as a liquid crystal layer is laminated, wettability is improved and thus a coating defect such as cissing can be reduced.

DESCRIPTION OF THE PREFERRED EMBODIMENTS

Figure 1:
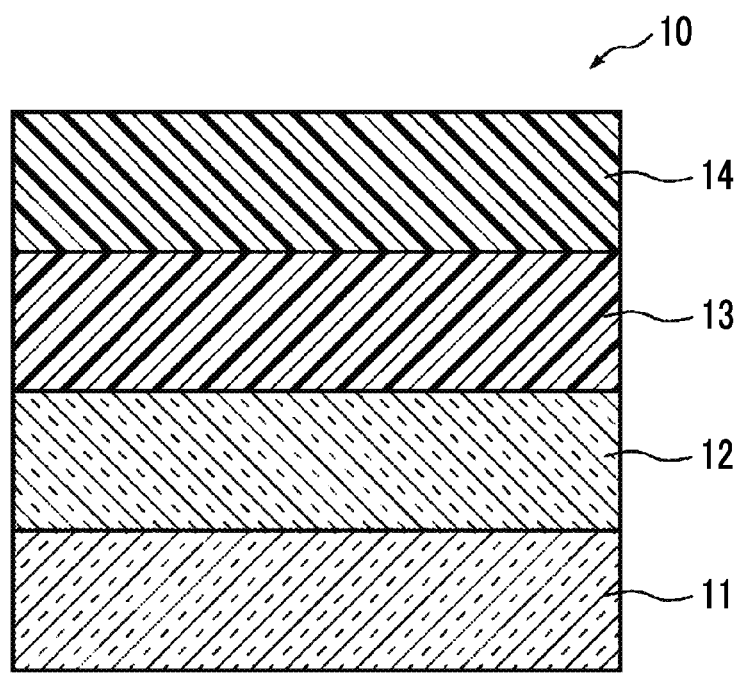
FIG. 1 is a schematic cross-sectional view showing an embodiment of an optical film of the present invention.

Hereinafter, the present invention will be described in detail. In the present specification, a numerical range represented by using "to" indicates a range including the numerical values before and after "to" as the lower limit and the upper limit.

In the present specification, the term "(meth)acryl group" means "any one or both of acryl group and methacryl group". The same applies to terms "(meth)acrylic acid", "(meth)acrylamide" and "(meth)acryloyl group".

[Composition for Preparing Optical Functional Layer]

Hereinafter, the constitutional components of a composition for preparing an optical functional layer of the present invention will be described.

(Copolymer)

The composition for preparing an optical functional layer of the present invention (hereinafter, simply referred to as "composition" in some cases) includes a liquid crystal compound and a copolymer, and the copolymer includes a constitutional unit corresponding to a fluoroaliphatic group-containing monomer represented by Formula I, and a constitutional unit corresponding to a monomer represented by Formula II.

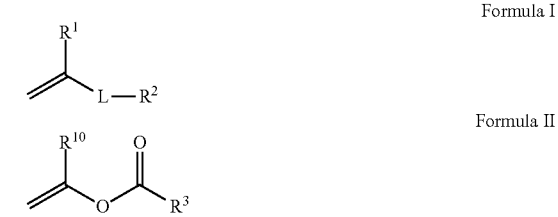

Formula I

Formula II

In Formulae I and II, $R^1$, $R^{10}$, and $R^3$ each independently represent a hydrogen atom or an alkyl group having 1 to 20 carbon atoms, $R^2$ represents an alkyl group having 1 to 20 carbon atoms in which at least one carbon atom has a fluorine atom as a substituent, and L represents a divalent linking group constituted by at least one selected from the group consisting of —O—, —(C=O)O—, —O(C=O)—, a divalent chain group, and a divalent aliphatic cyclic group.

The monomer represented by Formula I is a fluoroaliphatic group-containing monomer.

In Formula I, $R^1$ represents a hydrogen atom or an alkyl group having 1 to 20 carbon atoms. $R^1$ is preferably a hydrogen atom or an alkyl group having 1 to 10 carbon atoms, more preferably a hydrogen atom or an alkyl group having 1 to 4 carbon atoms, and even more preferably a hydrogen atom or a methyl group.

In Formula I, $R^2$ represents an alkyl group (fluoroalkyl group) having 1 to 20 carbon atoms in which at least one carbon atom has a fluorine atom as a substituent, is preferably a fluoroalkyl group having 1 to 12 carbon atoms, and more preferably a fluoroalkyl group having 2 to 10 carbon atoms. In addition, the number of fluorine atoms is preferably 1 to 25, more preferably 3 to 20, and most preferably 8 to 15.

In Formula I, L represents a divalent linking group constituted by at least one selected from the group consisting of —O—, —(C═O)O—, —O(C═O)—, a divalent chain group, and a divalent aliphatic cyclic group. Here, —(C═O)O— represents that $R^1$ and C═O are bonded and $R^2$ and O are bonded, and —O(C═O)— represents that $R^1$ and O are bonded and $R^2$ and C═O are bonded.

The divalent chain group represented by L is preferably an alkylene group having 1 to 20 carbon atoms, and more preferably an alkylene group having 1 to 10 carbon atoms.

The divalent aliphatic cyclic group represented by L is preferably a cycloalkylene group having 3 to 20 carbon atoms and more preferably a cycloalkylene group having 3 to 15 carbon atoms.

L is preferably —(C═O)O— or —O(C═O)— and more preferably —(C═O)O—.

From the viewpoint of effective hydrophilic surface formation and radical polymerization, the monomer represented by Formula I is more preferably a monomer represented by Formula III.

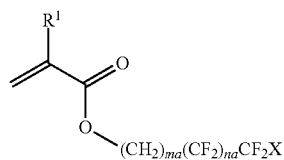

Formula III

In Formula III, $R^1$ represents a hydrogen atom or an alkyl group having 1 to 20 carbon atoms, ma and na each independently represent an integer of 1 to 10, and X represents a hydrogen atom or a fluorine atom.

In Formula III, $R^1$ is the same as $R^1$ in Formula I and the preferable range thereof is also the same.

In Formula III, ma and na each independently represent an integer of 1 to 10.

From the viewpoint of effective hydrophilic surface formation and easiness of raw material availability and production, in Formula III, ma is preferably an integer of 1 to 8, more preferably an integer of 1 to 5, and most preferably an integer of 1 or 2. In addition, na is preferably an integer of 1 to 8, more preferably an integer of 1 to 7, and most preferably an integer of 1 to 6.

In Formula III, X represents a hydrogen atom or a fluorine atom and preferably represents a fluorine atom.

Next, Formula II will be described.

In Formula II, $R^{10}$ represents a hydrogen atom or an alkyl group having 1 to 20 carbon atoms, is preferably a hydrogen atom or an alkyl group having 1 to 10 carbon atoms, more preferably a hydrogen atom or an alkyl group having 1 to 4 carbon atoms, and even more preferably a hydrogen atom.

In Formula II, $R^3$ represents a hydrogen atom or an alkyl group having 1 to 20 carbon atoms, is preferably an alkyl group having 1 to 14 carbon atoms, and more preferably an alkyl group having 1 to 8 carbon atoms.

Particularly, in Formula II, $R^3$ is preferably a methyl group, an ethyl group, a propyl group, a t-butyl group, or a n-butyl group from the viewpoint of responsiveness to external stimulation such as saponification treatment with alkali or the like.

Since the copolymer in the composition of the present invention has a vinyl ester structure represented by Formula II (which is different from an acrylic acid ester structure), a high surface energy interface (hydrophilic surface) can be formed. The mechanism of hydrophilic surface formation is considered such that by applying a composition including a solvent, for example, an acetyl group of vinyl acetate is aligned on the surface, the fluoroalkyl group that is directed to the surface at the time of application is moved into the film, and as a result, a hydrophilic surface is formed.

As a polarity conversion group, the copolymer in the composition of the present invention includes an ester group (*—O(C═O) type; * is a portion linked to a main chain) directly bonded to a main chain such as vinyl esters and does not include an ester group (*—(C═O)O— type; * is a portion linked to a main chain) such as acrylate. Since the copolymer includes an ester group directly bonded to a main chain, particularly, at the time of applying the composition in a laminated manner, application can be performed without cissing for an underlayer which is difficult to be applied due to the occurrence of cissing at the time of upper layer application in the related art.

In a case where the composition for optical film use is applied in a laminated manner, although there are still many questions regarding a cissing suppressing mechanism, it is assumed that due to the synergistic effect of the following effects: (1) the affinity with the underlayer is high; (2) the amount of the compound remaining at the interface between the underlayer and the upper layer is reduced due to good compatibility with an additive or the like extracted from the underlayer (a slight amount of compound remains in many cases, but in a case of the composition of the present invention, the present inventors think that cissing can be suppressed at the time of upper layer application by the above mechanism); (3) coatability is improved; and (4) surface migration properties are increased, surface tension unevenness and coating defects such as cissing in a drying process are less likely to be generated.

Although the reason that the ester group (*—O(C═O) type; * is a portion linked to the main chain) directly bonded to the main chain such as vinyl esters represented by Formula II is preferable is not clear, the present inventors think that one reason is that, compared to the ester group (*—(C═O)O— type; * is a portion linked to the main chain) such as acrylate, steric hindrance is small and it is easy to respond to external stimulation, that is, an ether bond is easily rotated. In addition, since the radical polymerization reactivity of fluorine acrylate and the radical polymerization reactivity of vinyl acetate are different from each other (polymerization of fluorine acrylate first proceeds), a rich fluorine part and a rich vinyl acetate polymer chain are present in a mixed state. It is thought that levelability and compatibility with a matrix (solubility as a coating composition) are effectively secured by this gradation.

In the copolymer of the present invention, the content of the monomer represented by Formula I is preferably 2% to 50% by mass, more preferably 3% to 30% by mass, and even more preferably 4% to 25% by mass with respect to the total mass of the copolymer.

In the copolymer of the present invention, the content of the monomer represented by Formula II is preferably 30% to 98% by mass, more preferably 35% to 97% by mass, and even more preferably 40% to 96% by mass with respect to the total mass of the copolymer.

The weight-average molecular weight Mw of the copolymer in the present invention is preferably 1,000 to 50,000, more preferably 1,500 to 30,000, even more preferably 2,000 to 25,000, and most preferably 2,000 to 15,000.

The number average molecular weight Mn of the copolymer in the present invention is preferably 500 to 40,000, more preferably 600 to 30,000, even more preferably 800 to 25,000, and most preferably 1,000 to 10,000.

The dispersity (Mw/Mn) of the copolymer in the present invention is preferably 1.00 to 12.00, more preferably 1.00 to 11.00, and even more preferably 1.00 to 10.00.

The weight-average molecular weight and the number average molecular weight are measured by gel permeation chromatography (GPC) under the measurement conditions which will be described later.

(Other Monomers)

The copolymer of the present invention may include monomers other than the above-described monomers as constitutional units. Examples of other monomers include styrene compounds such as styrene and α-methylstyrene; acrylonitrile compounds such as acrylonitrile, and methacrylonitrile; N-vinyl compounds such as N-vinylformamide; (meth)acrylamide compounds such as (meth)acrylamide, N-methylol (meth)acrylamide, diacetone (meth)acrylamide, N,N-dimethyl (meth)acrylamide, N,N-diethyl (meth)acrylamide, N-isopropyl (meth)acrylamide, (meth)acryloylmorpholine, and (meth)acrylamide; and (meth)acrylate compounds such as methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, amyl (meth)acrylate, hexyl (meth)acrylate, 2-ethylhexyl (meth)acrylate, octyl (meth)acrylate, tert-octyl (meth)acrylate, 2-chloroethyl (meth)acrylate, 2-bromoethyl acrylate, 4-chlorobutyl acrylate, cyanoethyl acrylate, 2-acetoxyethyl (meth)acrylate, acetoacetoxyethyl (meth)acrylate, 2-hydroxyethyl (meth)acrylate, butoxyethyl (meth)acrylate, carbitol (meth)acrylate, cyclohexyl (meth)acrylate, tetrahydrofurfuryl (meth)acrylate, benzyl (meth)acrylate, tridecyl (meth)acrylate, 2-phenoxyethyl (meth)acrylate, glycidyl (meth)acrylate, isobornyl (meth)acrylate, dicyclopentenyl (meth)acrylate, dicyclopentenyloxyethyl (meth)acrylate, dicyclopentanyl (meth)acrylate, 2-hydroxy-3-phenoxypropyl (meth)acrylate, 2-acryloyloxyethyl phthalic acid, methoxy-polyethylene glycol(meth)acrylate, 2-acryloyloxyethyl-2-hydroxyethyl phthalic acid, 2-(2-ethoxyethoxy)ethyl (meth)acrylate, 2-methoxyethyl (meth)acrylate, 3-methoxybutyl (meth)acrylate, ethoxylated phenyl (meth)acrylate, 2-(meth)acryloyloxyethyl succinic acid, nonylphenol EO adduct (meth)acrylate, phenoxy-polyethylene glycol (meth)acrylate, 2-(meth)acryloyloxyethyl hexahydrophthalic acid, lactone-modified (meth)acrylate, stearyl (meth)acrylate, isoamyl (meth)acrylate, isomyristyl (meth)acrylate, and isostearyl (meth)acrylate.

The copolymer in the present invention can be synthesized by a known method.

Specific examples of the copolymer in the present invention are as shown below. However, the present invention is not limited to these examples.

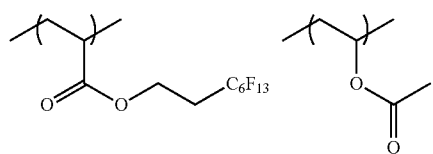

B-1

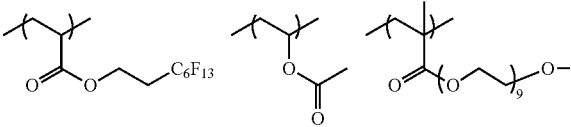

B-2

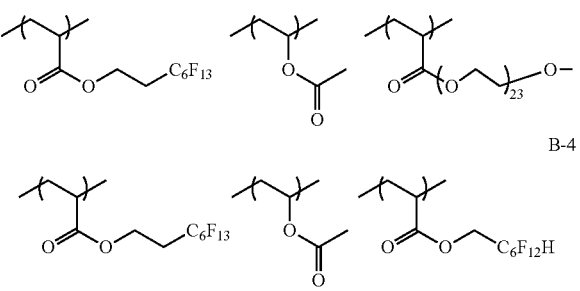

B-3

B-4

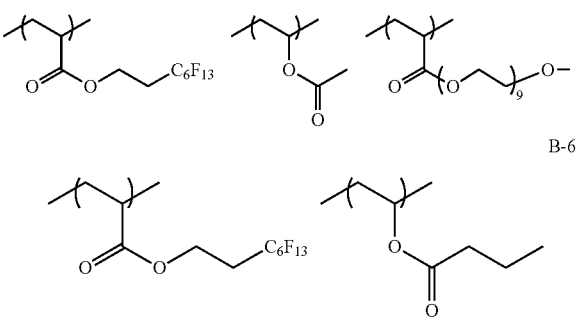

B-5

B-6

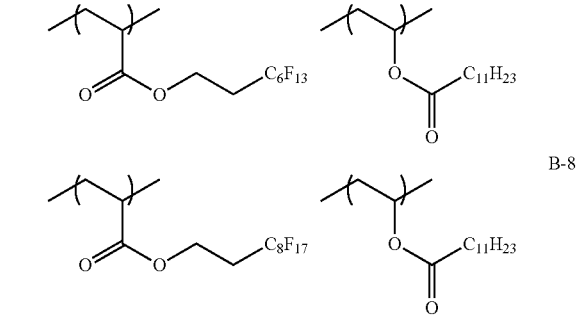

B-7

B-8

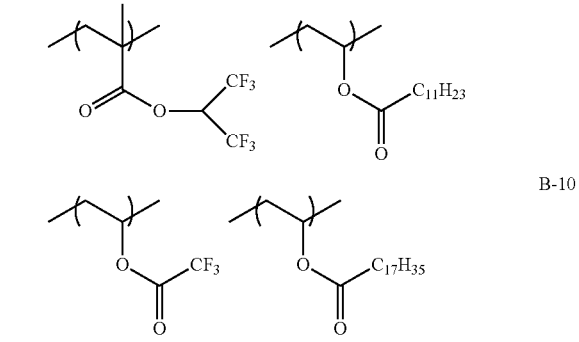

B-9

B-10

B-11

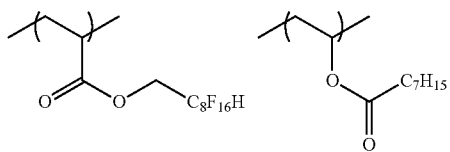

B-12

From the viewpoint of attaining both levelability and recoatability, the copolymer in the present invention is preferably 0.005% to 1% by mass, more preferably 0.01% to 0.5% by mass, and even more preferably 0.015% to 0.3% by mass in a case where the total solid contents of the composition for preparing an optical functional layer of the present invention (total components excluding a solvent) is set to 100% by mass.

(Liquid Crystal Compound)

As the liquid crystal compound, a rod-like liquid crystal compound and a disk-like liquid crystal compound can be used. In the liquid crystal compound, a low molecular liquid crystal compound is included. In the present invention, the term "low molecular" refers to a degree of polymerization of less than 100.

(Polymerizable Liquid Crystal Compound)

The liquid crystal compound may be a polymerizable liquid crystal compound. The polymerizable liquid crystal compound refers to a liquid crystal compound having a polymerizable group. Examples of the polymerizable group include an acryloyl group, a methacryloyl group, an epoxy group, and a vinyl group. The alignment of a liquid crystal compound can be fixed by curing the polymerizable liquid crystal compound and the polymerizable liquid crystal compound can be used for an optical compensation film or the like.

As the rod-like liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyl dioxanes, tolans and alkenylcyclohexyl benzonitriles are preferably used.

As the rod-like liquid crystal compound which is a polymerizable liquid crystal compound, compounds described in Makromol. Chem., vol. 190, page 2255 (1989), Advanced Materials vol. 5, p. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), and JP2001-64627 can be used. Further, as the rod-like liquid crystal compound, for example, compounds described in JP1999-513019A (JP-H11-513019A) and JP2007-279688A can be preferably used.

Examples of the disk-like liquid crystal compound include compounds described in JP2007-108732A and JP2010-244038A.

(Solvent)

The composition for preparing an optical functional layer of the present invention may contain a solvent. As the solvent, in consideration of solubility of the monomer, dispersibility of light transmissive particles, drying properties at the time of application, and the like, various solvents can be used. Examples of an organic solvent include dibutyl ether, dimethoxyethane, diethoxyethane, propylene oxide, 1,4-dioxane, 1,3-dioxolane, 1,3,5-trioxane, tetrahydrofuran, anisole, phenetol, dimethyl carbonate, methyl ethyl carbonate, diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, γ-butyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate, methyl alcohol such as ethyl acetoacetate, ethyl alcohol, isopropyl alcohol, n-butyl alcohol, cyclohexyl alcohol, isobutyl acetate, methyl isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene, xylene, methanol, ethanol, and t-butyl alcohol, and these may be used singly or in combination of two or more thereof.

The composition for preparing an optical functional layer of the present invention may contain additives such as a polymerization initiator in addition to the above components.

(Radical Polymerization Initiator)

The composition for preparing an optical functional layer of the present invention may contain a radical polymerization initiator.

The polymerization of a compound having an ethylenically unsaturated group can be performed by ionizing radiation irradiation or heating under the presence of a photo radical polymerization initiator or a thermal radical polymerization initiator. As the photo and thermal polymerization initiators, commercially available compounds can be used. These are described in "The Latest UV Curing Technique" (page 159; Publisher: Kazuhiro Takausu; Publishing company: Technical Information Institute Co. Ltd.; published in 1991), and catalogs from BASF SE.

Specific examples of the radical polymerization initiator that can be used include alkylphenone-based photopolymerization initiators (Irgacure (registered trademark) 651, Irgacure 184, DAROCURE (registered trademark)1173, Irgacure 2959, Irgacure 127, DAROCUREMBF, Irgacure 907, Irgacure 369, Irgacure 379EG), acylphosphine oxide-based photopolymerization initiators (Irgacure 819, LUCIRIN TPO), and others (Irgacure 784, Irgacure OXE01, Irgacure OXE02, Irgacure 754).

The amount of the radical polymerization initiator to be added is in a range of 0.1% to 10% by mass, preferably 1% to 5% by mass, and more preferably 2% to 4% by mass in a case where the total solid contents of the composition for preparing an optical functional layer of the present invention is set to 100% by mass. In a case where the amount of the radical polymerization initiator to be added is less than 0.1% by mass, the polymerization does not fully proceed and the hardness of the hard coat layer becomes insufficient. On the other hand, in a case where the amount of the radical polymerization initiator to be added is more than 10% by mass, ultraviolet (UV) light does not reach the inside of the film and the hardness of the hard coat layer becomes insufficient. These radical polymerization initiators may be used singly or in combination of a plurality of radical polymerization initiators.

(Cationic Polymerization Initiator)

The composition for preparing an optical functional layer of the present invention may contain a cationic polymerization initiator.

Examples of the cationic polymerization initiator include photoinitiators for photocationic polymerization, photodecolorizing agents for colorants, photodiscoloring agents, or known compounds such as acid generators used in microresists or the like, and mixtures thereof.

Examples thereof may include onium compounds, organic halogen compounds and disulfonic compounds. Specific examples of organic halogen compounds and disulfonic compounds include the same ones as listed for the compound capable of generating the radical.

Examples of onium compounds include diazonium salts, ammonium salts, iminium salts, phosphonium salts, iodonium salts, sulfonium salts, arsonium salts, and cellenonium salts, and for example, also include those compounds described in paragraphs [0058] and [0059] of JP2002-29162A.

As a cationic polymerization initiator that is particularly suitable for use in the present invention, onium salts may be used and diazonium salts, iodonium salts, sulfonium salts and iminium salts are preferable in terms of the photosensitivity upon initiation of photopolymerization and the stability of a compound material. Among these, iodonium salts are most preferable in terms of light resistance.

Specific examples of the onium salt that may suitably be used in the present invention include amylated sulfonium salts disclosed in paragraph [0035] of JP1997-268205A (JP-H09-268205A), diaryl iodonium salts or triaryl sulfonium salts disclosed in paragraphs [0010] and [0011] of JP2000-71366A, sulfonium salts of thiobenzoic acid S-phenyl ester described in paragraph [0017] of JP2001-288205A, and onium salts disclosed in paragraphs [0030] to [0033] of JP2001-133696A.

Other examples thereof include compounds such as organometallic/organic halogenated compounds, photo acid generators having an o-nitrobenzyl type protective group, and compounds that are photo-decomposed to generate a sulfonic acid (such as iminosulfonate) which are described in paragraphs [0059] to [0062] of JP2002-29162A.

Specific examples of the iodonium salt-based cationic polymerization initiator include B2380 (manufactured by Tokyo Chemical Industry Co., Ltd.), BBI-102 (manufactured by Midori Kagaku), WPI-113 (manufactured by Wako Pure Chemical Industries, Ltd.), WPI-124 (manufactured by Wako Pure Chemical Industries, Ltd.), WPI-169 (manufactured by Wako Pure Chemical Industries, Ltd.), WPI-170 (manufactured by Wako Pure Chemical Industries, Ltd.), and DTBPI-PFBS (manufactured by Toyo Gosei Co., Ltd.).

(Chiral Agent)

The liquid crystal layer formed of the composition for preparing an optical functional layer may be a layer formed by fixing a cholesteric liquid crystalline phase. In this case, the composition preferably includes a chiral agent.

The chiral agent can be selected from various known chiral agents (for example, described in "Liquid Crystal Device Handbook", Third Chapter, 4-3 Chapter, chiral agents used for TN and STN, page 199, edited by No. 142 Committee of Japan Society for the Promotion of Science, 1989). The chiral agent generally includes an asymmetric carbon atom but an axially asymmetric compound not including an asymmetric carbon atom or a planar asymmetric compound can be used as a chiral agent. Examples of the axially asymmetric compound or the planar asymmetric compound include binaphthyl, helicene, paracyclophane, and derivatives thereof. The chiral agent may have a polymerizable group. In the case in which the chiral agent has a polymerizable group and the rod-like liquid crystal compound to be used in combination also has a polymerizable group, a polymer having a repeating unit derived from the rod-like liquid crystal compound and a repeating unit derived from the chiral agent can be formed by a polymerization reaction of the chiral agent having a polymerizable group and the polymerizable rod-like liquid crystal compound. In this embodiment, it is preferable that the polymerizable group of the chiral agent having the polymerizable group is the same as the polymerizable group of the polymerizable rod-like liquid crystal compound. Accordingly, the polymerizable group of the chiral agent is also preferably an unsaturated polymerizable group, an epoxy group, or an aziridinyl group, more preferably an unsaturated polymerizable group, and particularly preferably an ethylenically unsaturated polymerizable group.

In addition, the chiral agent may be a liquid crystal compound.

Examples of a chiral agent exhibiting a strong twisting force that can be preferably used include chiral agents described in JP2010-181852A, JP2003-287623A, JP2002-80851A, JP2002-80478A, and JP2002-302487A. Further, regarding isosorbide compounds described in these known publications, isosorbide compounds having corresponding structures can be used and regarding isomannide compounds described in these known publications, isomannide compounds having corresponding structures can be used.

(Fluorine-Based Surfactant and Silicone-Based Surfactant)

The composition for preparing an optical functional layer of the present invention may contain at least one of a fluorine-based surfactant or a silicone-based surfactant. The surface of the formed hard coat layer is less likely to be hydrophobic and in a case of forming an upper layer, cissing is less likely to occur. At the same time, from the viewpoint of maintaining a balance of the hydrophilicity and hydrophobicity of the coating film, the lower the content thereof is, more preferable it is. Specifically, the content of the fluorine-based surfactant and the silicone-based surfactant in the composition for preparing an optical functional layer is preferably 0.05% by mass or less and more preferably 0.01% by mass or less with respect to the total mass of the composition for preparing an optical functional layer.

The fluorine-based surfactant is a compound which includes fluorine and is unevenly distributed on the surface in the solvent to be used in the composition for preparing an optical functional layer. Examples of a fluorine-based surfactant having a hydrophobic moiety include compound containing fluorine among compounds described in paragraphs [0028] to [0034] of JP2011-191582A as an alignment suppressing agent and fluorine-based surfactants described in JP2841611B, and fluorine-based surfactants described in paragraphs [0017] to [0019] of JP2005-272560A.

Examples of a commercially available fluorine-based surfactant include SURFLON manufactured by AGC SEIMI CHEMICAL CO., LTD., MEGAFAC manufactured by DIC Corporation, and FTERGENT manufactured by NEOS COMPANY LIMITED.

The silicone-based surfactant is a compound which includes silicone and is unevenly distributed on the surface in the solvent to be used in the composition for preparing an optical functional layer.

Examples of the silicone-based surfactant include low molecular compounds containing a silicon atom such as polymethylphenylsiloxane, polyether-modified silicone oil, polyether-modified dimethylpolysiloxane, dimethyl silicone, diphenyl silicone, hydrogen-modified polysiloxane, vinyl-modified polysiloxane, hydroxy-modified polysiloxane, amino-modified polysiloxane, carboxyl-modified polysiloxane, chloro-modified polysiloxane, epoxy-modified polysiloxane, methacryloxy-modified polysiloxane, mercapto-modified polysiloxane, fluorine-modified polysiloxane, long-chain alkyl-modified polysiloxane, phenyl-modified polysiloxane, and silicone-modified copolymer.

Examples of a commercially available silicone-based surfactant include KF-96 and X-22-945 (manufactured by Shin-Etsu Chemical Co., Ltd.), TORAY SILICONE DC3PA, TORAY SILICONE DC7PA, TORAY SILICONE SH11PA, TORAY SILICONE SH21PA, TORAY SILICONE SH28PA, TORAY SILICONE SH29PA, TORAY SILICONE SH3OPA, and TORAY SILICONE FS-1265-300 (all manufactured by Dow Corning Toray Silicone Co., Ltd.), TSF-4300, TSF-4440, TSF-4445, TSF-4446, TSF-4452, and TSF-4460 (all manufactured by GE Toshiba Silicones Co., Ltd.), polysiloxane polymer KP341 (manufactured by Shin-Etsu Chemical Co., Ltd.), BYK-301, BYK-302, BYK-307, BYK-325, BYK-331, BYK-333, BYK-341, BYK-345, BYK-346, BYK-348, and BYK-375 (manufactured by BYK-Chemie Japan KK), ARON GS-30 (manufactured by TOAGOSEI CO., LTD.), and SILICONE L-75, Silicone L-76, SILICONE L-77, SILICONE L-78, Silicone L-79, SILICONE L-520, and SILICONE L-530 (manufactured by Nippon Unicar. Co., Ltd.).

[Optical Film]

An optical film of the present invention includes a cholesteric liquid crystal layer containing the composition for preparing an optical functional layer of the present invention on a support.

With reference to FIG. 1, an embodiment of the optical film of the present invention will be described. FIG. 1 is a schematic cross-sectional view showing an embodiment of the optical film of the present invention. In FIG. 1, the scale of each portion is appropriately changed for allowing easy viewing. As shown in FIG. 1, an optical film 10 includes a λ/4 layer 12, a cholesteric liquid crystal layer 13, and a cholesteric liquid crystal layer 14 on a support 11. The cholesteric liquid crystal layer 13 and the cholesteric liquid crystal layer 14 are in contact with each other. The optical film may be formed by only these liquid crystal layers, may further include a liquid crystal layer, or may include layers other than the liquid crystal layer. Examples of other layers include a λ/4 layer, an alignment layer, a surface protective layer, and a hard coat layer. In addition, the optical film may further have liquid crystal layers other than the liquid crystal layer formed of the composition of the present invention.

The cholesteric liquid crystal layer 13 includes a liquid crystal layer containing the composition of the present invention or a liquid crystal layer formed by curing a composition including the composition of the present invention. In the liquid crystal layer formed by curing, the cholesteric liquid crystal phase is fixed.

As shown in FIG. 1, it is preferable that the optical film 10 has a structure in which the liquid crystal layer close to the support 11 is set to an underlayer (liquid crystal layer 13) and on the surface thereof as an upper layer, and the liquid crystal layer 14 formed by applying the composition of the present invention further including a solvent is provided. At this time, the solvent of the composition can be selected from the organic solvents exemplified in the above description. A structure in which a layer is further formed on the surface of the liquid crystal layer 13 in the same manner is preferable and the optical film 10 may be a laminated film of three to ten liquid crystal layers formed in the same manner.

In the optical film 10, it is preferable that any one of the liquid crystal layer 13 and the liquid crystal layer 14 is a layer formed of a composition including a rod-like liquid crystal compound, and the other is a layer formed of a composition including a disk-like liquid crystal compound. Further, it is also preferable that any one of the liquid crystal layer 13 and the liquid crystal layer 14 is a layer formed by curing a composition including a polymerizable rod-like liquid crystal compound, and the other is a layer formed by curing a composition including a polymerizable disk-like liquid crystal compound. It is more preferable that the liquid crystal layer 13 is a layer including a disk-like liquid crystal compound and the liquid crystal layer 14 is a layer including a rod-like liquid crystal compound.

In the embodiment, the cholesteric liquid crystal layer in which two layers are laminated has been described. However, the number of layers is not limited to two and a plurality of layers such as three or more layers may be laminated. In this case, a cholesteric liquid crystal layer including a rod-like liquid crystal compound and a cholesteric liquid crystal layer including a disk-like liquid crystal compound are preferably included.

The use of the optical film 10 is not particularly limited. Examples of the optical film include a phase difference film, a reflection film, and a light absorption film. More specific examples thereof include an optical compensation film, a polarizing film, a luminance improving film, a heat blocking film, and a film for projection used for a liquid crystal display device or the like.

The optical film prepared using the composition of the present invention may be a support film for preparing a laminated film other than the form of the optical film 10 of the embodiment. The support film includes the above underlayer (liquid crystal layer 13). It is preferable that the support film includes the liquid crystal layer 13 as the outermost layer or includes only a film which is easily peelable, such as a laminate film or the like, on the outer side of the liquid crystal layer 13. It is preferable that the liquid crystal layer 13 in the support film is a liquid crystal layer. It is more preferable that the liquid crystal layer 13 in the support film is a layer formed by curing a composition including a polymerizable disk-like liquid crystal compound. The support film may include layers such as a support, an alignment layer, and another liquid crystal layer in addition to the liquid crystal layer 13.

(Support)

As the support 11, glass and a polymer film can be used. Examples of materials for a polymer film used as the support include cellulose acylate film (for example, a cellulose triacetate film (refractive index 1.48), a cellulose diacetate film, a cellulose acetate butyrate film, and a cellulose acetate propionate film), polyolefin such as polyethylene and polypropylene, a polyester-based resin film such as polyethylene terephthalate or polyethylene naphthalate, a polyether sulfone film, a polyacrylic resin film such as polymethyl methacrylate, a polyurethane-based resin film, a polycarbonate film, a polysulfone film, a polyether film, a polymethylpentene film, a polyether ketone film, a (meth)acrylonitrile film, polyolefin, and a cycloolefin-based polymer film (for example, product name "ARTON" (registered trademark), manufactured by JSR Corporation, product name "ZEONEX" (registered trademark), manufactured by Zeon Corporation). Among these, triacetyl cellulose, polyethylene terephthalate, and a polymer having an alicyclic structure are preferable and triacetyl cellulose is particularly preferable.

The support may be a temporary support not including the optical film which is peeled off after the liquid crystal layer is formed.

The film thickness of the support may be about 5 µm to 1,000 µm, is preferably 10 µm to 250 µm, and more preferably 15 µm to 90 µm.

(Alignment Layer)

The optical film may include an alignment layer. The alignment layer is used when a layer such as a liquid crystal layer is formed and is used for aligning the molecules of a liquid crystal compound included in the composition for preparing an optical functional layer.

The alignment layer can be provided by means of a rubbing treatment of an organic compound (preferably a polymer), an oblique vapor deposition of an inorganic compound such as SiO, the formation of a layer having a microgroove, or the like. Further, there is also known an alignment layer in which an alignment function occurs by applying an electric field, applying a magnetic field, or carrying out light irradiation.

Depending on the materials for the underlayer such as the support and the liquid crystal layer, the underlayer can be allowed to function as the alignment layer by carrying out a directly alignment treatment (for example, a rubbing treatment) on the underlayer without providing the alignment layer. Examples of the support which becomes such an underlayer include polyethylene terephthalate (PET).

In addition, in the case in which a layer is directly laminated on the liquid crystal layer, the liquid crystal layer of the underlayer behaviors as the alignment layer and thus the liquid crystal compound for preparing an upper layer can be aligned in some cases. In such a case, the liquid crystal compound of the upper layer can be aligned without providing the alignment layer and carrying out a particular alignment treatment (for example, a rubbing treatment).

Hereinafter, a rubbing-treated alignment layer of which the surface is subjected to a rubbing treatment to be used and a photo alignment layer will be described as preferable examples.

—Rubbing-Treated Alignment Layer—

As examples of the polymer that can be used for the rubbing-treated alignment layer, for example, include methacrylate-based copolymers, styrene-based copolymers, polyolefins, polyvinyl alcohols, modified polyvinyl alcohols, poly(N-methylolacrylamide), polyesters, polyimides, vinyl acetate copolymers, carboxymethyl cellulose, and polycarbonates described in paragraph [0022] of JP1996-338913A (JP-H08-338913A). A silane coupling agent can be used as a polymer. A water-soluble polymer (for example, poly(N-methylolacrylamide), carboxymethyl cellulose, gelatin, polyvinyl alcohol, or modified polyvinyl alcohol) is preferable, gelatin, polyvinyl alcohol, or modified polyvinyl alcohol is more preferable, and polyvinyl alcohol or modified polyvinyl alcohol is most preferable.

The above-described composition is applied to the rubbing-treated surface of the alignment layer and the molecules of the liquid crystal compound are aligned. Thereafter, as necessary, the above-described liquid crystal layer (optically anisotropic layer) can be formed by reacting an alignment layer polymer with a polyfunctional monomer included in the optically anisotropic layer or crosslinking an alignment layer polymer using a crosslinking agent.

The film thickness of the alignment layer is preferably within a range of 0.1 to 10 µm.

—Rubbing Treatment—

The surface of the alignment layer, the support, or another layer to which the composition for preparing an optical functional layer is applied may be subjected to a rubbing treatment as necessary. The rubbing treatment can be generally carried out by rubbing the surface of the film having a polymer as a main component with paper or cloth in a predetermined direction. A general method of the rubbing treatment is described, for example, in "Liquid Crystal Handbook" (published by MARUZEN CO., LTD., Oct. 30, 2000).

As the method of changing the rubbing density, the method described in "Liquid Crystal Handbook" (published by MARUZEN CO., LTD.) can be used. The rubbing density L is quantified by the following Equation A.

$$L=Nl(1+2\pi rn/60\ v)\qquad\text{Equation A}$$

In equation A, N is the number of rubbing, l is the contact length of a rubbing roller, r is the radius of a roller, n is a rotation speed (rpm) of a roller, and v is a stage moving speed (speed per second).

In order increase the rubbing density, the number of rubbing may be increased, the contact length of a rubbing roller may be lengthened, the radius of a roller may be increased, the rotation speed of a roller may be increased, or the stage moving speed may be lowered. On the other hand, in order to decrease the rubbing density, the opposite operation thereof may be carried out. In addition, as the conditions at the time of the rubbing treatment, it is also possible to refer to the description in JP4052558B.

—Photo Alignment Layer—

The photo alignment materials used for the photo alignment layer formed by light irradiation are described in a number of documents. Preferable examples thereof include azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadimide compounds having photo alignment units described in JP2002-265541A and JP2002-317013A, photo cross-linkable silane derivatives described in JP4205195B and JP4205198B, and photo cross-linkable polyimides, polyamides, or esters described in JP2003-520878A, JP2004-529220A, and JP4162850B. Azo compounds, photo cross-linkable polyimides, polyamides or esters are particularly preferable.

The photo alignment layer is produced by irradiating the photo alignment layer formed of the above material with linearly polarized light or unpolarized light.

In the specification, the term "linearly polarized light irradiation" is an operation for causing a photoreaction to the photo alignment material. The wavelength of the light used is not particularly limited as long as the wavelength varies depending on the photo alignment material used and is a wavelength necessary for the photoreaction. The peak wavelength of the light used for light irradiation is preferably 200 nm to 700 nm and ultraviolet light having a light peak wavelength of 400 nm or less is more preferable.

The light source of the light irradiation may be a typically used light source and examples thereof include lamps (for example, a tungsten lamp, a halogen lamp, a xenon lamp, a xenon flash lamp, a mercury lamp, a mercury/xenon lamp, or a carbon arc lamp), various lasers (for example, a semiconductor laser, a helium/neon laser, an argon ion laser, a helium/cadmium laser, or an YAG laser), light emitting diodes, and cathode ray tubes.

As means for obtaining linearly polarized light, a method using a polarizing plate (for example, an iodine polarizing plate, a dichroic dye polarizing plate, or a wire grid polarizing plate), a method using a prism element (for example, a Glan-Thompson prism) or a reflective type polarizer using Brewster's angle, or a method using light emitted from a polarized laser light source may be adopted. Alternatively, light having only a necessary wave length may be selectively employed for irradiation using a filter, a wavelength conversion element, or the like.

In the case of using linearly polarized light as light for irradiation, a method in which the alignment layer is irradiated with the light from the upper surface or rear surface in a direction perpendicular or oblique to the alignment layer surface is adopted. Although the incidence angle of the light varies depending on the photo alignment material, for example, the incidence angle is 0° to 90° and preferably 40° to 90°. In this case, 90° is a perpendicular direction.

In the case of using unpolarized light, the alignment layer is irradiated with unpolarized light from an oblique direction. The incidence angle of the light is 10° to 80°, preferably 20° to 60°, and particularly preferably 30° to 50°.

The irradiation time is preferably 1 minute to 60 minutes, and more preferably 1 minute to 10 minutes.

(Method of Producing Optical Film)

The optical film can be produced by forming the liquid crystal layer on the support. The support may be peeled off after the liquid crystal layer is formed. In the specification, the term "on the support" used herein means "directly on the surface of the support" or "through another layer formed on the surface of the support". The liquid crystal layer may be formed on the surface of another layer which has been formed in advance.

It is preferable that the liquid crystal layer is further formed on the surface of the liquid crystal layer as described above. The liquid crystal layer formed of the composition for preparing an optical functional layer of the present invention hardly causes cissing and thus various lamination type optical films can be prepared. It is particularly preferable that the composition of the present invention is directly applied to the surface of the liquid crystal layer which has been formed in advance. When the composition of the present invention is applied to form a film, cissing hardly occurs, the surface condition is excellent, and further, alignment defects can be reduced.

(Formation of Liquid Crystal Layer)

The liquid crystal layer is formed by a coating film formed of the composition of the present invention. For example, the liquid crystal layer may be a layer formed by applying the composition to the support and drying the obtained coating film and may be a layer formed through a curing step by light irradiation, heating, or the like.

The application of the composition of the present invention can be carried out by a method of deploying the composition by an appropriate method such as a roll coating method, a gravure printing method, or a spin coating method. Further, the composition can be applied by various methods such as a wire bar coating method, an extrusion coating method, a direct gravure coating method, a reverse gravure coating method, and a die-coating method. In addition, it is also possible to form a coating film by jetting the composition from a nozzle using an ink jet device.

Drying may be carried out by leaving or heating the coating film. In a drying step, an optical function derived from the liquid crystal component may be exhibited. For example, in the case in which the liquid crystal component includes a liquid crystal compound, in the process of removing a solvent by drying, a liquid crystal phase may be formed. The formation of the liquid crystal phase may be carried out by heating the coating film to obtain a transition temperature to a liquid crystal phase. For example, by heating to the temperature of the isotropic phase once and then cooling to the liquid crystal phase transition temperature, the liquid crystal composition can be made to be stably in a state of a liquid crystal phase. The liquid crystal phase transition temperature is preferably within a range of 10° C. to 250° C. and more preferably within a range of 10° C. to 150° C. from the viewpoint of production suitability. When the transition temperature is lower than 10° C., a cooling step or the like of lowering the temperature to a temperature range in which a liquid crystal phase is exhibited is required. When the transition temperature is higher than 200° C., a high temperature is required to make be in an isotropic liquid state of a temperature higher than the temperature range in which a liquid crystal phase is exhibited, and also from the viewpoint of waste of heat energy or deformation or deterioration of a substrate, this case is disadvantageous.

For example, in the case in which the composition includes a polymerizable compound, it is preferable that the film after the above drying is cured. In the case in which the composition includes a polymerizable liquid crystal compound, the alignment state of the molecules of the liquid crystal compound can be maintained and fixed by curing. The curing can be carried out by a polymerization reaction of the polymerizable group in the polymerizable compound.

The polymerization reaction includes a thermal polymerization reaction using a thermal polymerization initiator and a photopolymerization reaction using a photopolymerization initiator. The photopolymerization reaction is preferable. The light irradiation for polymerization of the polymerizable compound, particularly, the polymerizable liquid crystal compound is preferably carried out using ultraviolet rays. The irradiation energy is preferably 50 mJ/cm$^2$ to 1,000 mJ/cm$^2$ and more preferably 100 to 800 mJ/cm$^2$. In order to accelerate the photopolymerization reaction, light irradiation may be carried out under a heating condition.

In order to accelerate a curing reaction, ultraviolet irradiation may be carried out under a heating condition. In addition, since the oxygen concentration in the atmosphere is involved in the polymerization degree, in a case in which a desired polymerization degree is not achieved in air and the film hardness is not sufficient, by a method of nitrogen substitution or the like, it is preferable to reduce the oxygen concentration in the atmosphere. The oxygen concentration is preferably 10% by volume or less, more preferably 7% by volume or less, and most preferably 3% by volume or less.

The reaction rate of the curing reaction (for example, polymerization reaction) which proceeds by irradiation with ultraviolet rays is preferably 60% or more, more preferably 70% or more, and still more preferably 80% or more, from the viewpoint of keeping mechanical strength of a layer or preventing the unreacted substances from flowing out from a layer. In order to improve the reaction rate, a method of increasing the irradiation amount of ultraviolet rays applied or a polymerization in a nitrogen atmosphere or under a heating condition is effective. In addition, after polymerization, a method of further promoting the reaction by a thermal polymerization reaction by keeping a state of a temperature higher than the polymerization temperature or a method of carrying out irradiation with ultraviolet rays again can also be used. The reaction rate can be measured by comparing the values of the absorption intensity of the infrared vibrational spectrum of the reactive group (for example, a polymerizable group) before and after the reaction progress.

The optical properties based on the alignment of the liquid crystal compound molecules of the liquid crystal layer using the liquid crystal compound as a liquid crystal component, for example, the optical properties of a cholesteric liquid crystalline phase, are sufficient as long as the optical properties are kept in the layer and it is no longer necessary that the liquid crystal composition of the liquid crystal layer after curing exhibits liquid crystallinity. For example, the liquid crystal composition may lose liquid crystallinity by increasing the molecular weight of the liquid crystal compound molecule by a curing reaction.

The liquid crystal layer is also preferably a cholesteric liquid crystal layer formed by fixing the alignment of a cholesteric liquid crystalline phase. As the cholesteric liquid crystal layer and the method of producing the cholesteric liquid crystal layer, for example, cholesteric liquid crystal layers and methods described in JP1989-133003A (JP-H01-133003A), JP3416302B, JP3363565B, and JP1996-271731A (JP-H08-271731A) can be referred to.

[Liquid Crystal Display Device]

Figure 2:
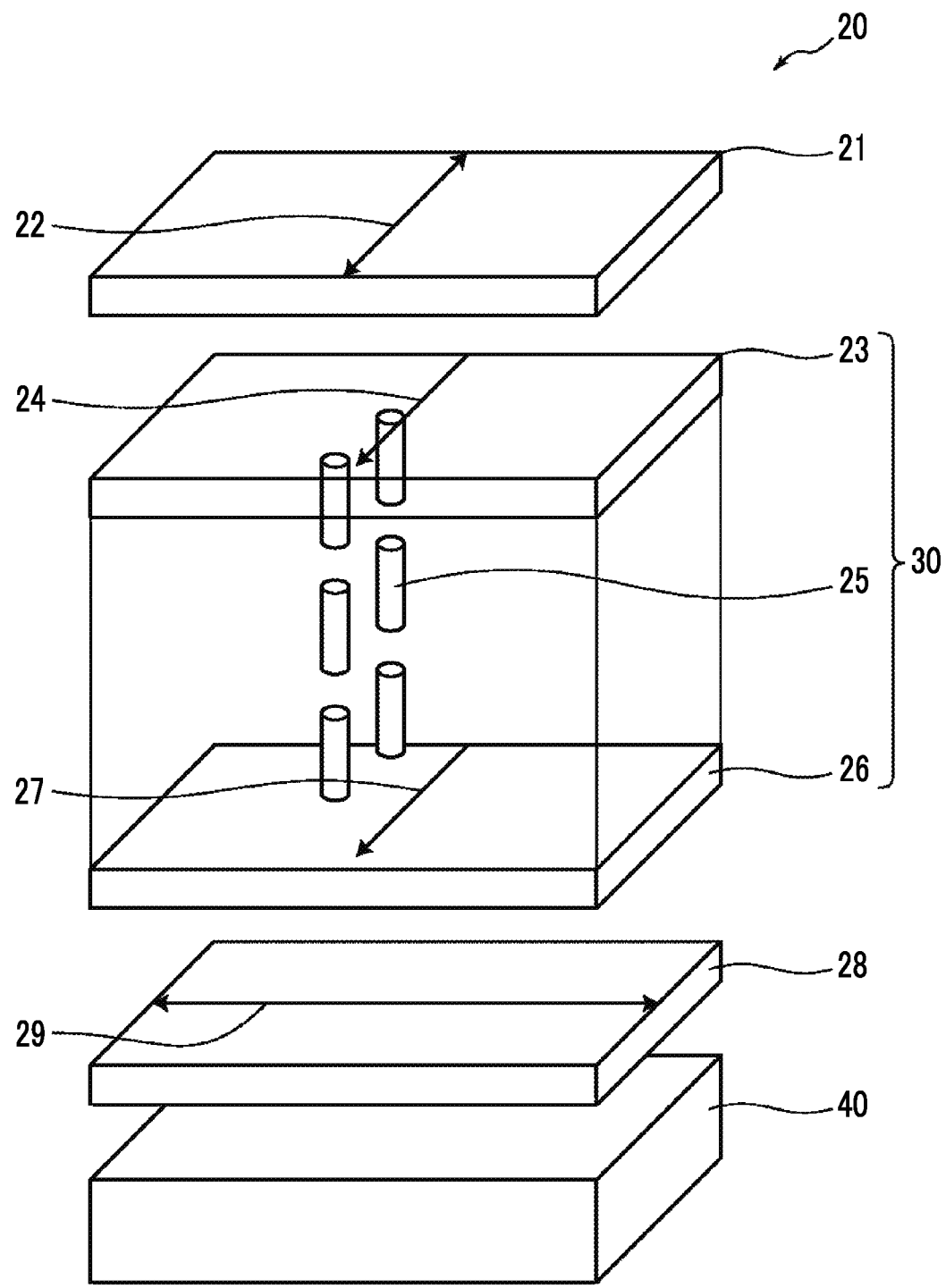
FIG. 2 is a schematic view showing the configuration of an embodiment of a liquid crystal display device of the present invention.
Figure 3:
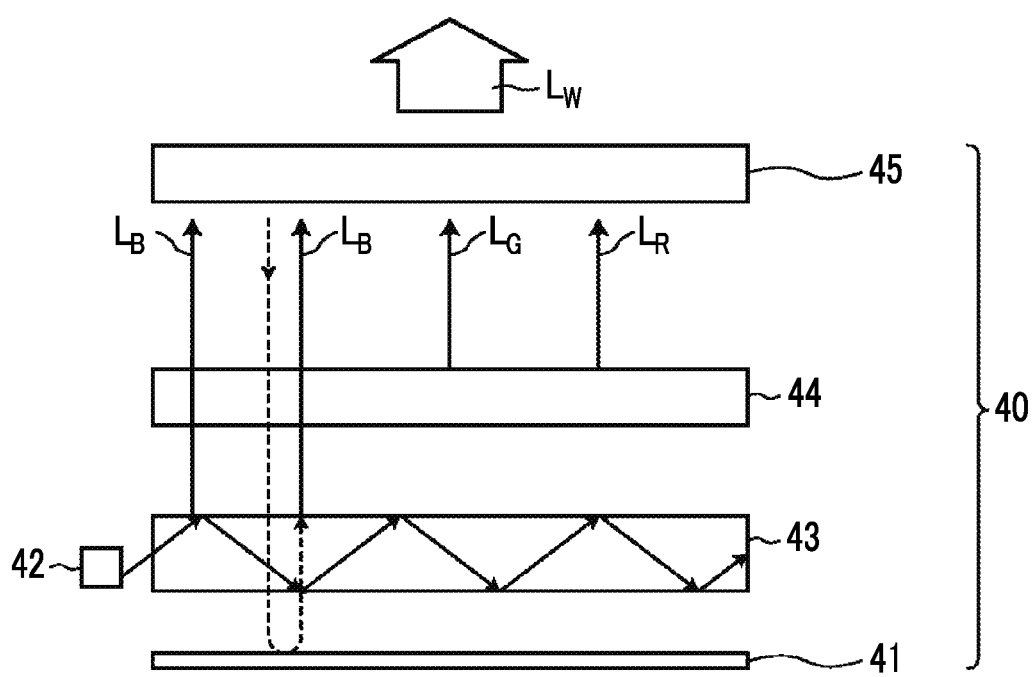
FIG. 3 is a schematic cross-sectional view showing an embodiment of a backlight in the liquid crystal display device of the present invention.

The optical film of the present invention can be used as a luminance improving film used for a backlight of a liquid crystal display device. Hereinafter, an embodiment of a liquid crystal display device of the present invention will be described. FIG. 2 is a schematic view showing the configuration of an embodiment of a liquid crystal display device 20 according to the present invention. FIG. 3 is a schematic cross-sectional view showing an embodiment of a backlight unit.

As shown in FIG. 2, the liquid crystal display device 20 includes a pair of polarizing plates (an upper side polarizing plate 21 and a lower side polarizing plate 28), a liquid crystal cell 30 interposed between the polarizing plates, and a backlight unit 40 on the opposite side of the liquid crystal cell of the lower side polarizing plate 28, and the liquid crystal cell 30 has liquid crystals 25 and a liquid crystal cell upper electrode substrate 23 and a liquid crystal cell lower electrode substrate 26 which are arranged on the upper and lower sides of the liquid crystals. Since the backlight unit 40 includes a polarized light emitting film, the lower side polarizing plate 28 can be omitted.

In the case in which the liquid crystal display device 20 is used as a transmission type, the upper side polarizing plate 21 is set to a front side (viewing side) polarizing plate and the lower side polarizing plate 28 is set to a rear side (backlight side) polarizing plate. Although not shown in the drawing, a color filter is provided between the liquid crystals 25 and the upper side polarizing plate 21. In FIG. 2, the numeral references 22 and 29 indicate directions of absorption axes of each polarizing plate which are substantially mutually orthogonal to each other, and the numeral references 24 and 27 indicate alignment control directions of each electrode substrate.

As shown in FIG. 3, the backlight unit 40 includes a light source 42 which emits primary light (blue light $L_B$), a light guide plate 43 which guides and emits the primary light emitted from the light source 42, a wavelength conversion member 44 which is provided on the light guide plate 43, a luminance improving film 45 which is arranged to face the light source 42 with the wavelength conversion member 44 interposed therebetween, and a reflection plate 41 which is arranged to face the wavelength conversion member 44 with the light guide plate 43 interposed therebetween. The wavelength conversion member 44 emits fluorescent light by using at least a part of the primary light emitted from the light source 42 as exciting light, and emits secondary light ($L_G$, $L_R$) formed of the fluorescent light and the primary light $L_B$ which has passed through the wavelength conversion member 44. The backlight unit 40 emits white light $L_W$ by the secondary light ($L_G$, $L_R$) and the primary light $L_B$ which has passed through the wavelength conversion member 44.

The luminance improving film 45 has the optical film 10 of the present invention.

As the light source 42, a light source that emits blue light having a light emission center wavelength in a wavelength range of 430 nm to 480 nm, for example, blue light emitting diode emitting blue light can be used. In the case of using a light source that emits blue light, it is preferable that the wavelength conversion member 44 at least includes a quantum dot R which emits red light excited by exciting light and a quantum dot G which emits green light. Thus, white light can be realized by the blue light emitted from the light source and passing through the wavelength conversion member and the red light and green light emitted from the wavelength conversion member.

In another embodiment, as the light source, a light source that emits ultraviolet light having a light emission center wavelength in a wavelength range of 300 nm to 430 nm, for example, an ultraviolet light emitting diode can be used. In this case, it is preferable that the wavelength conversion member 44 includes a quantum dot B that emits blue light excited by exciting light as well as quantum dots R and G. Thus, white light can be realized by the red light, the green light, and the blue light emitted from the wavelength conversion member.

In still another embodiment, a laser light source can be used instead of using a light emitting diode.

The light source to be provided may be a light source that emits blue light having a light emission center wavelength in a wavelength range of 430 to 500 nm, green light having a light emission center wavelength in a wavelength range of 500 to 600 nm, and red light having at least a part of the peak of the light emitting intensity in a wavelength range of 600 to 700 nm, and thus as embodiments other than the above light source, a white light source such as a white light emitting diode (LED) may be used.

In the case in which the backlight unit 40 has the light guide plate 43, the wavelength conversion member 44 is arranged on the path of the light emitted from the light guide plate 43. As the light guide plate 43, any known light guide plate can be used without limitation. In addition, the backlight unit 40 can include a reflecting member at the rear portion of the light source 42. The reflecting member is not particularly limited and known reflecting members can be used. The reflecting members described in JP3416302B, JP3363565B, JP4091978B, or JP3448626B are exemplified, and the contents thereof are incorporated in the present invention.

The backlight unit 40 preferably also has a known diffusion plate or a diffusion sheet, a prism sheet (for example, BEF series, manufactured by Sumitomo 3M Ltd.), and a light guide. Other members described above are described in JP3416302B, JP3363565B, JP4091978B, and JP3448626B are exemplified, and the contents thereof are incorporated in the present invention.

In the liquid crystal display device including the above backlight unit, the drive mode of the liquid crystal cell is not particularly limited and various modes such as twisted nematic (TN), super twisted nematic (STN), vertical alignment (VA), in-plane switching (IPS), and an optically compensated bend cell (OCB) can be used. The liquid crystal cell is preferably a VA mode, an OCB mode, an IPS mode, or a TN mode, but is not limited thereto. The configuration of the liquid crystal display device in the VA mode may adopt the configuration shown in FIG. 2 of JP2008-262161A as an example. However, the specific configuration of the liquid crystal display device is not particularly limited and a known configuration can be adopted.

When the luminance improving film of the backlight unit includes the optical film of the present invention, the wavelength conversion region of particularly red and green light is widened and thus high luminance backlight and liquid crystal display device can be obtained.

EXAMPLES

Hereinafter, the present invention will be more specifically described with reference to examples. The materials, reagents, amounts, proportions of substances, operations, and the like shown in the examples below may be changed as appropriate without departing from the spirit of the present invention. Therefore, the scope of the present invention is not to be interpreted as limiting to the examples shown below.

Synthesis Example 1

Synthesis Example of Copolymer B-101

Into a 200 ml three-neck flask equipped with a stirrer, a thermometer, a reflux cooling pipe, and a nitrogen gas introduction tube, 23.0 g of methyl ethyl ketone was put, and the temperature was increased to 75° C. Next, a liquid mixture of 4.00 g (9.6 mmol) of 2-(perfluorohexyl)ethyl acrylate, 16.00 g (185.9 mmol) of vinyl acetate, 23.3 g of methyl ethyl ketone, and 1.556 g of "V-601" (manufactured by Wako Pure Chemical Industries, Ltd.) was added dropwise thereto at a constant speed such that the dropwise addition was completed in 180 minutes. After the completion of the dropwise addition, stirring further continued for 2 hours, the temperature was then increased to 87° C., and stirring further continued for 5 hours. Thus, 56.4 g of a methyl ethyl ketone solution of a copolymer (B-1) was obtained. The copolymer (B-101) has a structure of the copolymer (B-1) exemplified in the specific example.

The weight-average molecular weight Mw and the number average molecular weight Mn of the copolymer were calculated by 2,300 (gel permeation chromatography (Eco SEC HLC-8320GPC (manufactured by Tosoh Corporation)) in terms of polystyrene under the measurement conditions of a flow rate of 0.35 ml/min and a temperature of 40° C. using an eluent of tetrahydrofuran (THF), and connected three columns of TSKgel Super HZM-H, TSKgel Super HZ4000, and TSKgel Super HZ200 (manufactured by Tosoh Corporation) were used.)

In addition, the structure of the obtained copolymer was identified by a $^1$H-nuclear magnetic resonance (NMR) spectrum and the compositional ratio thereof was determined.

$^1$H-NMR (CDCl$_3$) δ: 4.0 to 4.2 and 4.3 to 4.5 (2H, derived from methylene group of 2-(perfluorohexyl)ethyl acrylate), 4.8 to 5.2 (1H, derived from methine group of vinyl acetate)

Synthesis Examples 2 to 14

Compounds (copolymers) B-102 to B-114 of the present invention were synthesized in the same manner as in Synthesis Example 1 except that the kind of monomer and the compositional ratio thereof were changed respectively as shown in Table 1. The structures of the copolymers B-101 to B-114 are the copolymers B-1 to B-12 shown in the specific example.

TABLE 1

| Copolymer | | | Monomer represented by Formula I | | Monomer represented by Formula II | | Monomers other than monomers represented by Formulae I and II | | Polymerization initiator | | Molecular weight (GPC) | | |
|---|---|---|---|---|---|---|---|---|---|---|---|---|---|
| Kind | Structure | Synthesis Example | Kind | Parts by mass | Kind | Parts by mass | Kind | Parts by mass | Kind | Amount [mol %] | Mw(k) | Mn(k) | Mw/Mn |
| B-101 | B-1 | Synthesis Example 1 | C6FA | 20 | VAc | 80 | None | — | V-601 | 0.9 | 2.3 | 1.1 | 2.15 |
| B-102 | B-2 | Synthesis Example 2 | C6FA | 20 | VAc | 70 | PME-400 | 10 | V-601 | 3.8 | 3.8 | 1.4 | 2.64 |
| B-103 | B-3 | Synthesis Example 3 | C6FA | 20 | VAc | 70 | AM-230G | 10 | V-601 | 2.5 | 4.2 | 1.6 | 2.63 |
| B-104 | B-4 | Synthesis Example 4 | C6FA/C6FHA | 20/10 | VAc | 70 | None | — | V-601 | 3.8 | 2.8 | 1.2 | 2.38 |
| B-105 | B-5 | Synthesis Example 5 | C6FA | 20 | VAc | 70 | AME-400 | 10 | V-601 | 3.8 | 3.6 | 1.4 | 2.56 |
| B-106 | B-6 | Synthesis Example 6 | C6FA | 30 | VB | 70 | None | — | V-601 | 0.9 | 5.2 | 2.3 | 2.26 |
| B-107 | B-7 | Synthesis Example 7 | C6FA | 25 | VL | 75 | None | — | V-601 | 1.2 | 4.4 | 1.9 | 2.32 |
| B-108 | B-8 | Synthesis Example 8 | C8FA | 30 | VL | 70 | None | — | V-601 | 2.4 | 4.8 | 2.1 | 2.29 |
| B-109 | B-9 | Synthesis Example 9 | HFMA | 20 | VL | 80 | None | — | V-601 | 2.1 | 4.2 | 1.9 | 2.21 |
| B-110 | B-1 | Synthesis Example 10 | C6FA | 70 | VAc | 30 | None | — | V-601 | 2.2 | 5.9 | 2.2 | 2.68 |
| B-111 | B-10 | Synthesis Example 11 | CF3VAc | 40 | VS | 60 | None | — | V-601 | 2.3 | 5.5 | 2.1 | 2.62 |
| B-112 | B-11 | Synthesis Example 12 | C6FVE | 50 | VS | 50 | None | — | V-601 | 1.8 | 6.5 | 2.8 | 2.32 |
| B-113 | B-12 | Synthesis Example 13 | C8FHA | 45 | VN-O | 55 | None | — | V-601 | 3.1 | 4.7 | 1.9 | 2.47 |
| B-114 | B-3 | Synthesis Example 14 | C6FA/C6FHA | 30/10 | VAc | 60 | None | — | V-601 | 0.03 | 28.9 | 12.1 | 2.39 |

The abbreviations in Table 1 mean as follows.
C6FHA: 1H,1H,7H-dodecafluoroheptyl acrylate
C8FHA: 1H,1H,9H-dodecafluorononyl acrylate
C6FA: 2-(perfluorohexyl)ethyl acrylate
C8FA: 2-(perfluorooctyl)ethyl acrylate
HFMA: 1,1,1,3,3,3-hexafluoroisopropyl methacrylate
C6FVE: (3,3,4,4,5,5,6,6,7,7,8,8,8-tridecafluorooctyl) vinyl ether
CF3VAc: vinyl trifluoroacetate
VAc: vinyl acetate
VB: vinyl butyrate
VN-O: vinyl n-octanoate
VL: vinyl laurate
VS: vinyl stearate
PME-400: BLENMER PME-400 (manufactured by NOF Corporation)
AME-400: BLENMER AME-400 (manufactured by NOF Corporation)
AM-230G: NK ester AM-230G (manufactured by Shin-Nakamura Chemical Co., Ltd.)
V-601: (manufactured by Wako Pure Chemical Industries, Ltd.)

[Preparation of Optical Film]

Optical films of Examples and Comparative Examples were prepared using the compounds (copolymers) B-101 to B-110 obtained above and compounds H101 to H103 of Comparative Examples, which will be described later.

The optical film was formed by sequentially laminating an alignment layer, a λ/4 layer, an alignment layer, a liquid crystal layer 1, and a liquid crystal layer 2 on a support. The method of forming each layer and coating solutions will be described below.

<Support: TD40UL>

As the support, a commercially available cellulose acylate film "TD40UL" (manufactured by Fujifilm Corporation) was used. Hereinafter, the support will be referred to as TD40UL.

<TD40UL with Alignment Layer>

TD40UL was allowed to pass through a dielectric heating roll at a temperature of 60° C. and the film surface temperature was increased to 40° C. Then, an alkali solution having the following composition was applied to one surface of the film using a bar coater to have a coating amount of 14 ml/m² and the film was transported under a steam type far-infrared heater manufactured by NORITAKE CO., LIMITED heated at 110° C. for 10 seconds. Subsequently, pure water was applied in an amount of 3 ml/m² using a bar coater in the same manner. Next, washing with water using a fountain coater and water removal using an air knife were repeated three times and then the film was transported to a drying zone at 70° C. for 10 seconds to be dried. Thus, a cellulose acylate film which had been subjected to an alkali saponification treatment was prepared.

—Alkali Solution Composition—

| | |
|---|---|
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

—Formation of Alignment Layer—

An alignment layer coating solution having the following composition was continuously applied to the elongated cellulose acetate film which had been subjected to a saponification treatment as described above using a #14 wire bar. The coating solution was dried at a temperature of 60° C. for 60 seconds and further dried at a temperature of 100° C. for 120 seconds. The obtained coating film was continuously subjected to a rubbing treatment to prepare an alignment layer. At this time, the longitudinal direction and the transport direction of the elongated film were parallel with each other, and the rotary shaft of a rubbing roller was oriented in a clockwise direction of 45° with respect to the longitudinal direction of the film.

—Composition of Alignment Layer Coating Solution—

| | |
|---|---|
| Modified polyvinyl alcohol below | 10 parts by mass |
| Water | 371 parts by mass |
| Methanol | 119 parts by mass |
| Glutaraldehyde | 0.5 parts by mass |
| Photopolymerization initiator (IRGACURE 2959, manufactured by BASF SE) | 0.3 parts by mass |

The structural formula of the modified polyvinyl alcohol in the alignment layer coating solution is shown below. In the following structural formula, the ratio is a molar ratio.

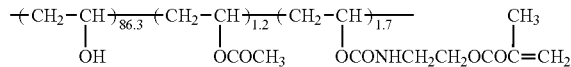

<TD40UL+Alignment Layer+λ/4 Layer>

A coating solution A1 including a disk-like liquid crystal compound having the following composition was continuously applied to the above-prepared alignment layer using a #3.6 wire bar. The transport speed (V) of the film was set to 20 m/min. In order to dry a solvent of the coating solution and age the alignment of the disk-like liquid crystal compound, the film was heated by hot air of a temperature 60° C. for 90 seconds. Subsequently, the alignment of the liquid crystal compound was fixed by irradiating the film with UV at 60° C., thereby forming a λ/4 layer. At this time, the amount of UV irradiation was set to 100 mJ/cm².

—Coating Solution A1 Including Disk-Like Liquid Crystal Compound—

| | |
|---|---|
| Disk-like liquid crystal compound (Compound 101) | 80 parts by mass |
| Disk-like liquid crystal compound (Compound 102) | 20 parts by mass |
| Polymerizable monomer | 10 parts by mass |
| Alignment assistant 1 | 0.9 parts by mass |
| Alignment assistant 2 | 0.1 part by mass |
| Surfactant (MEGAFAC F444 manufactured by DIC Corporation) | 0.12 parts by mass |
| Fluorine-containing compound 1 | 0.03 parts by mass |
| Polymerization initiator 1 | 3 parts by mass |
| Methyl ethyl ketone | 178.4 parts by mass |
| t-Butanol | 54.9 parts by mass |
| Cyclohexanone | 41.2 parts by mass |

-continued
Compound 101
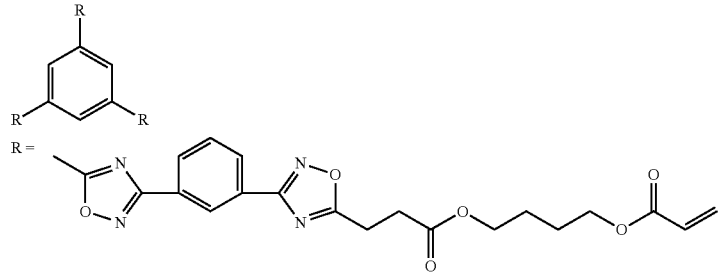
Compound 102
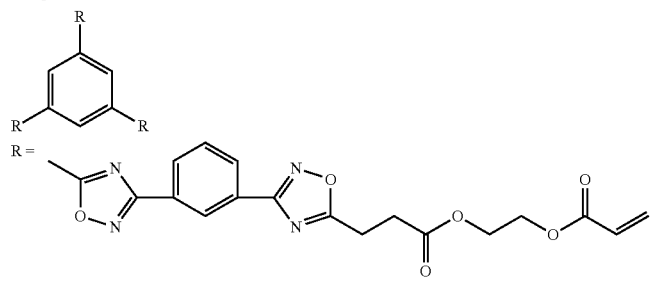
Alignment assistant 1
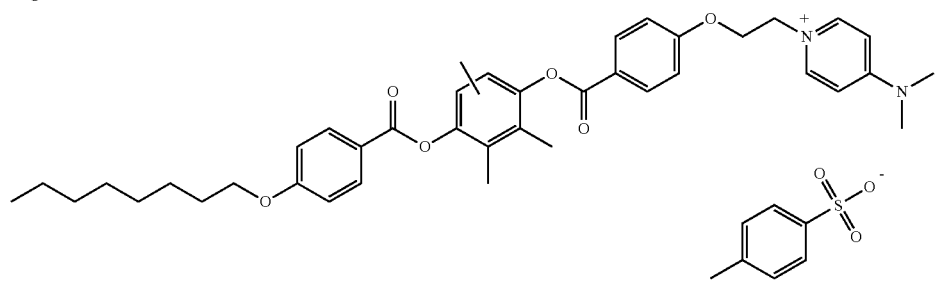
Alignment assistant 2
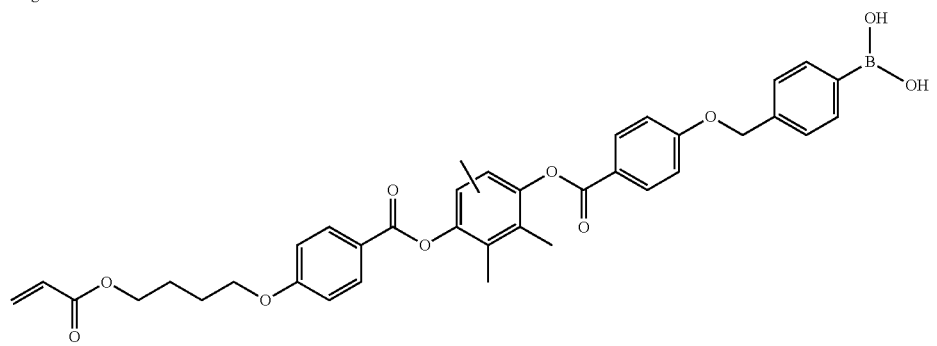
Polymerization initiator 1
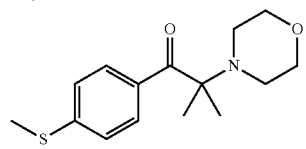 [SMILES: CSc1ccc(C(=O)C(C)(C)N2CCOCC2)cc1]
Polymerizable monomer
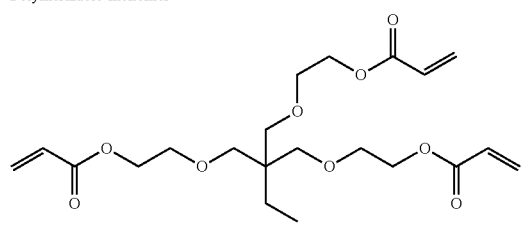

Fluorine-containing compound 1

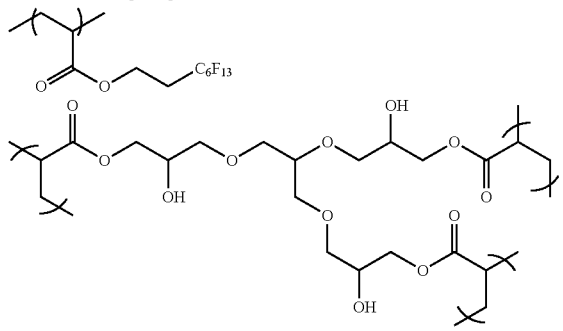

The above alignment assistants 1 and 2 are mixtures of two compounds in which the substitution positions of the methyl group in the respective trimethyl substituted benzene rings are different. The mixing ratio of two compounds is 50:50 by mass ratio.

<TD40UL+Alignment Layer+λ/4 Layer+Alignment Layer>

An alignment layer was prepared on the surface of the λ/4 layer in the same manner as described above.

<TD40UL+Alignment Layer+λ/4 Layer+Alignment Layer+Liquid Crystal Layer 1 (Underlayer)>

The following coating solution B1 was continuously applied to the surface of the alignment layer while adjusting the amount of coating solution so as to have a film thickness of 3 μm. Subsequently, the solvent was dried at 70° C. for 2 minutes to vaporize the solvent. Then, the film was thermally aged at 115° C. for 3 minutes and thus a homogeneous alignment state was obtained. Thereafter, the coating film was kept at 50° C. and irradiated with ultraviolet rays using a high pressure mercury lamp under a nitrogen atmosphere to form a cholesteric liquid crystal layer (liquid crystal layer 1). At this time, the amount of UV irradiation was set to 75 mJ/cm$^2$.

(Preparation of Coating Solution B1 Used for Liquid Crystal Layer 1 of Example 1)

—Composition of Coating Solution B1—

| | |
|---|---|
| Disk-like liquid crystal compound (Compound 101) | 80 parts by mass |
| Disk-like liquid crystal compound (Compound 102) | 20 parts by mass |
| Copolymer B-101 of present invention | 0.05 parts by mass |
| Polymerization initiator 1 | 3 parts by mass |
| Chiral agent 1 | 5.5 parts by mass |
| Methyl ethyl ketone | 112.5 parts by mass |
| t-Butanol | 34.6 parts by mass |
| Cyclohexanone | 26.0 parts by mass |

The structure of the chiral agent 1 is shown below.

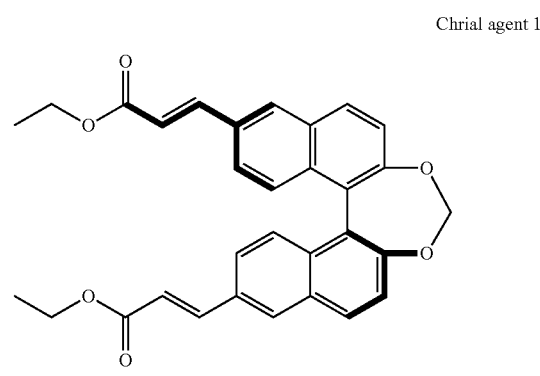

Chrial agent 1

(Preparation of Coating Solution Used for Liquid Crystal Layers 1 of Examples 2 to 19 and Comparative Examples 1 to 4)

Coating solutions (B2 to B19) of the present invention and coating solutions (BH-1 to BH-4) of Comparative Examples were prepared in the same manner as in the preparation of the coating solution B1 except that the kind of compound and the added amount thereof were changed respectively as shown in Table 2. Hereinafter, compounds H101 to H103 using the coating solutions of Comparative Examples are shown.

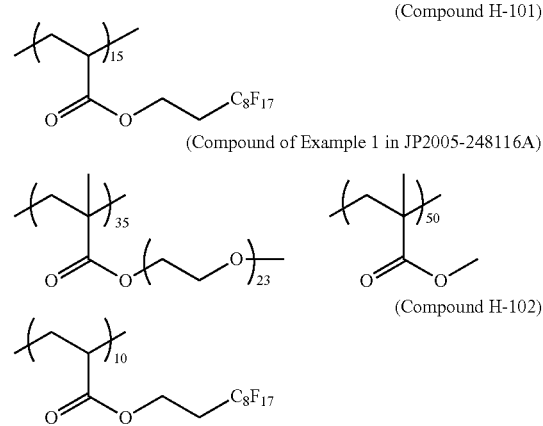

(Compound H-101)

(Compound of Example 1 in JP2005-248116A)

(Compound H-102)

-continued
(Compound of Example 1 in JP2000-102727A)

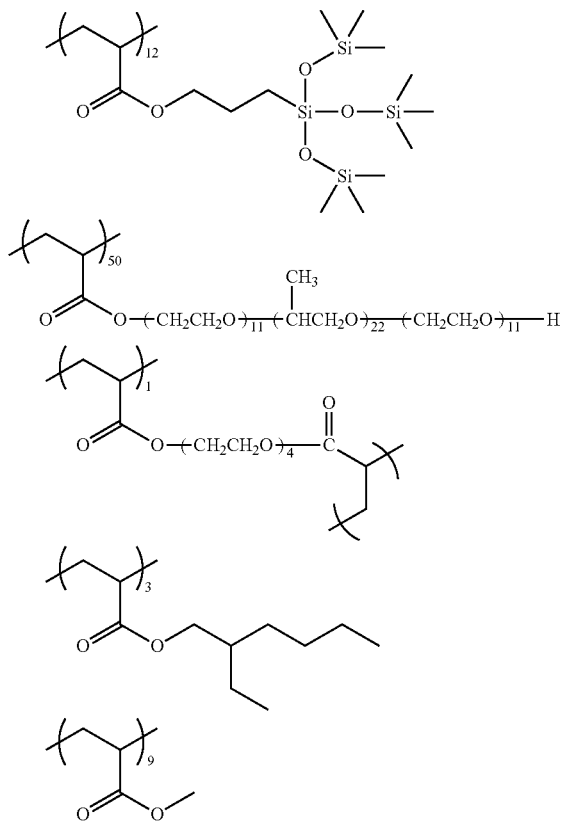

(Compound H-103)

F-552: commercially available fluorine-based surface modifier (product name: MEGAFAC F-552, manufactured by DIC Corporation)

<TD40UL+λ/4 layer+Alignment Layer+Liquid Crystal Layer 1 (Underlayer)+Liquid Crystal Layer 2 (Upper Layer)>

A coating solution C1 including a rod-like liquid crystal compound having the following composition was continuously applied to the surface of the liquid crystal layer 1 prepared using the above coating solution B1 while adjusting the amount of the coating solution so as to have a film thickness of 5 μm. The transport speed of the film was set to 20 m/min. In order to dry a solvent of the coating solution and age the alignment of the rod-like liquid crystal compound, the film was heated by hot air of a temperature 95° C. for 180 seconds. Subsequently, the alignment of the liquid crystal compound was fixed by irradiating the film with UV at 30° C., thereby forming an optically anisotropic layer. At this time, the amount of UV irradiation was set to 300 mJ/cm².

—Coating Solution C1 of Liquid Crystal Layer 2—

| | |
|---|---|
| Rod-like Liquid Crystal Compound 201 | 83 parts by mass |
| Rod-like Liquid Crystal Compound 202 | 15 parts by mass |
| Rod-like Liquid Crystal Compound 203 | 2 parts by mass |
| Polyfunctional monomer A-TMMT (manufactured by Shin-Nakamura Chemical Co., Ltd.) | 1 part by mass |
| Polymerization initiator IRGACURE 819 (manufactured by BASF SE) | 4 parts by mass |
| Fluorine-containing compound 2 | 0.17 parts by mass |
| Chiral agent LC756 (manufactured by BASF SE) | 6 parts by mass |
| Toluene | 187.5 parts by mass |
| Cyclohexanone | 9.9 parts by mass |

The rod-like liquid crystal compounds are shown below.

Rod-like liquid crystal compound 201

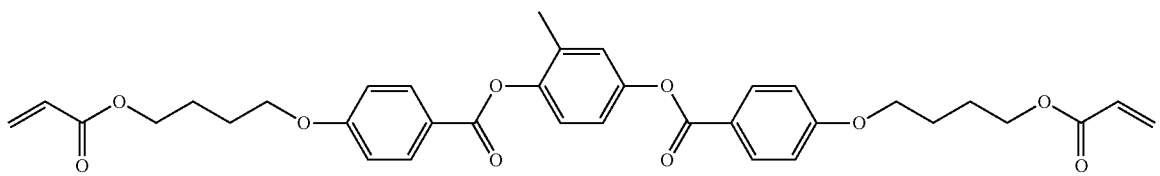

Rod-like liquid crystal compound 202

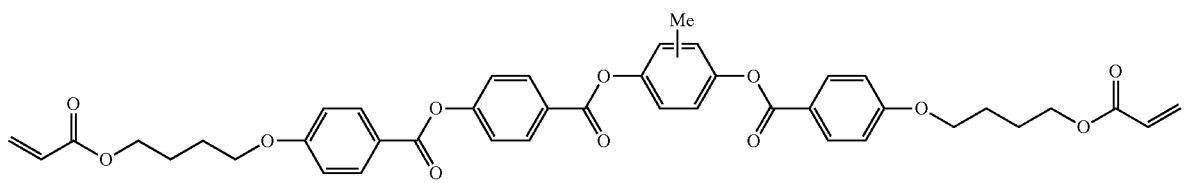

Rod-like liquid crystal compound 203

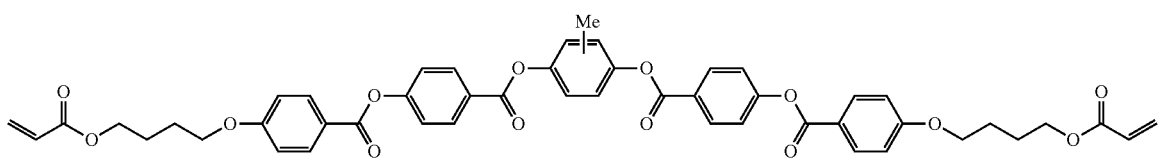

The fluorine-containing compound 2 is shown below.

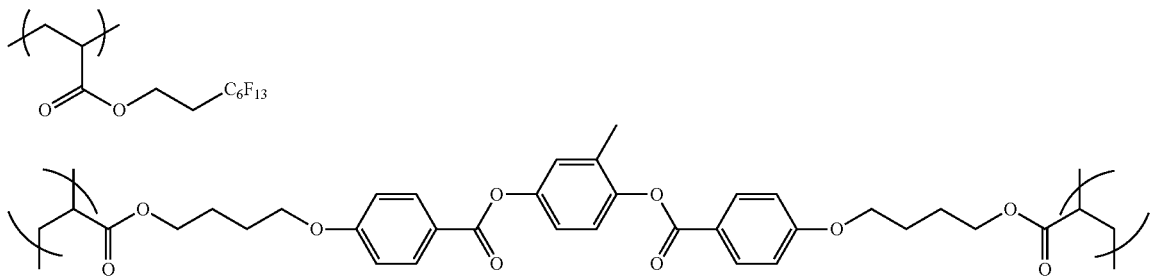

In addition, an overcoat layer coating solution C2 used in Example 19 was prepared.

—Overcoat Layer Coating Solution C2—

| | |
|---|---|
| DPHA: KAYARD DPHA (manufactured by Nippon Kayaku Co., Ltd.)) (hexafunctional) | 37.9 parts by mass |
| IRGACURE 184: alkylphenone-based photopolymerization initiator (manufactured by BASF SE) | 2.20 parts by mass |
| 3,4-epoxycyclo hexylmethyl methacrylate: CYCLOMER M100 (manufactured by Daicel Chemical Industries Ltd., molecular weight: 196) | 13.8 parts by mass |
| Compound 1 | 0.55 parts by mass |
| Tinuvin 928: benzotriazole-based ultraviolet absorbing agent (manufactured by BASF SE) | 0.55 parts by mass |
| MEK: methyl ethyl ketone | 16.7 parts by mass |
| MiBK: methyl isobutyl ketone | 19.8 parts by mass |
| Methyl acetate | 8.5 parts by mass |

The compound 1 was synthesized by the method described in Example 1 of JP4841935B. The structure of the compound 1 is shown below.

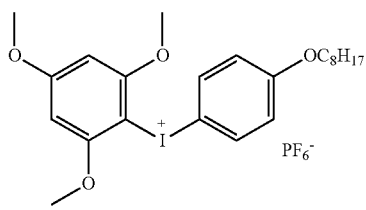

(Measurement of Viscosity of Coating Solution)

The viscosity of the coating solutions B1 to B19, C1, and C2 and BH-1 to BH-4 was measured using Vm-100 (vibration type viscometer) manufactured by SEKONIC CORPORATION. The viscosity of all of the coating solutions was in a range of 1.5 to 10 mPa·s.

Evaluation on the prepared optical films was performed based on the following standards. The results are shown in Table 2.

<Cissing>

The number of cissing in the layer formed using each composition in the film of a size of 15 cm×20 cm in each of Examples and Comparative Examples was counted. Here, a region on the surface of the underlayer in which an upper layer was not formed was counted as a cissing defect. Based on the results, evaluation was carried out based on the following evaluation standards.

As long as the grade of the evaluation standard is A or B, the production efficiency is excellent, it is possible to suitably use the film. It is most preferable that the grade of the evaluation standard is A.

(Evaluation Standard)
A: The number of cissing is 1 or less.
B: The number of cissing is more than 1 to 3 or less.
C: The number of cissing is 4 or more and 10 or less.
D: The number of cissing is more than 10.

<Surface Condition>

Regarding the layer after application, the surface condition was visually confirmed. Evaluation was performed based on the following standards.

As long as the grade of the evaluation standard is A or B, the production efficiency is excellent, and the film can be suitably used. The grade of the evaluation standard is most preferably A.

(Evaluation Standard)
A: The surface does not have dry unevenness and wrinkles.
B: Slight dry unevenness is observed but the film can be used without a problem.
C: The amount of dry unevenness and roughness is large compared to B but the film can be used without a problem.
D: The roughness caused by dry unevenness is apparently observed and the film is not suitable to be used.

<Alignment>

Whether the liquid crystal alignability was excellent or poor was evaluated based on the following evaluation standards depending on the presence or absence of alignment defects when the film was observed with a polarizing microscope (product name "ECLIPSE", manufactured by Nikon Corporation).

As long as the grade of the following evaluation standard is A or B, the production efficiency is excellent, and the film can be suitably used. The grade of the evaluation standard is most preferably A.

(Evaluation Standard)
A: No alignment defect exists.
B: Almost no alignment defect exists.
C: Alignment defects exist in some parts.
D: Alignment defects exist on the whole surface.

<Liquid Crystal Display Device>

When a commercially available liquid crystal display device (product name "TH-L42D2", manufactured by Panasonic Corporation) was disassembled and the luminance improving film in the backlight unit thereof was changed to the optical film of the present invention to form a liquid crystal display device of the present invention, the performance was good.

TABLE 2

| | Support | λ/4 Layer | Coating solution Underlayer | Upper layer | Compound Kind | Added amount | Performance 1 (underlayer) Cissing | Surface condition | Alignment | Performance 2 (upper layer) Cissing | Surface condition | Alignment |
|---|---|---|---|---|---|---|---|---|---|---|---|---|
| Example 1 | TD40UL | A1 | B1 | C1 | B-101 | 0.03 | A | A | A | A | A | A |
| Example 2 | TD40UL | A1 | B2 | C1 | B-102 | 0.04 | A | A | A | A | A | A |
| Example 3 | TD40UL | A1 | B3 | C1 | B-103 | 0.07 | A | A | A | A | A | A |
| Example 4 | TD40UL | A1 | B4 | C1 | B-104 | 0.05 | A | A | A | A | A | A |
| Example 5 | TD40UL | A1 | B5 | C1 | B-105 | 0.03 | A | A | A | A | A | A |
| Example 6 | TD40UL | A1 | B6 | C1 | B-106 | 0.05 | A | A | A | A | B | A |
| Example 7 | TD40UL | A1 | B7 | C1 | B-107 | 0.04 | A | B | A | A | A | A |
| Example 8 | TD40UL | A1 | B8 | C1 | B-108 | 0.07 | A | A | A | A | B | A |
| Example 9 | TD40UL | A1 | B9 | C1 | B-109 | 0.08 | B | A | B | A | A | B |
| Example 10 | TD40UL | A1 | B10 | C1 | B-110 | 0.05 | B | B | B | A | B | A |
| Example 11 | TD40UL | A1 | B11 | C1 | B-101 | 0.04 | A | A | A | A | A | A |
| Example 12 | TD40UL | A1 | B12 | C1 | B-103 | 0.25 | A | A | B | A | A | B |
| Example 13 | TD40UL | A1 | B13 | C1 | B-105 | 0.2 | A | A | B | A | A | B |
| Example 14 | TD40UL | A1 | B15 | C1 | B-102 | 0.4 | A | A | B | A | A | B |
| Example 15 | TD40UL | A1 | B16 | C1 | B-104 | 0.7 | A | A | B | A | A | B |
| Example 16 | TD40UL | A1 | B17 | C1 | B-106 | 0.02 | B | A | A | A | A | A |
| Example 17 | TD40UL | A1 | B18 | C1 | B-110 | 0.01 | B | A | A | B | A | A |
| Example 18 | TD40UL | A1 | B19 | C1 | B-103 | 0.06 | B | B | B | B | B | B |
| Example 19 | TD40UL | A1 | B1 | C2 | B-101 | 0.03 | A | A | A | A | A | — |
| Comparative Example 1 | TD40UL | A1 | BH-1 | C1 | H-101 | 0.25 | D | D | D | C | C | C |
| Comparative Example 2 | TD40UL | A1 | BH-2 | C1 | H-102 | 0.2 | D | D | D | C | C | C |
| Comparative Example 3 | TD40UL | A1 | BH-3 | C1 | H-103 | 0.3 | D | D | D | C | C | C |
| Comparative Example 4 | TD40UL | A1 | BH-4 | C1 | None | — | D | A | A | C | A | A |

As seen from Table 2, in Examples 1 to 19 in which the composition of the present invention was used, good results could be obtained in all evaluation items of cissing, surface condition, and alignment for the upper layer and the underlayer. Particularly, in a case of applying the upper layer, in all of Examples, the grade of the evaluation of cissing was B or higher. This is because a hydrophilic surface was formed on the surface of the underlayer by using the composition of the present invention.

On the other hand, in Comparative Examples 1, 2, and 3 in which the composition containing the polymer in which the oxygen atom of the ester group is not directly bonded to the main chain of the polymer was used, the evaluation grade was C and poor in all evaluation items for the upper layer. In Comparative Example 4 not having the copolymer in the present invention, while the grades of the evaluation of surface condition and alignment were A, the grade of the evaluation of cissing was C.

As described above, since the composition of the present invention is capable of satisfactorily preventing a coating defect such as cissing occurring at the time of film formation by coating, the composition of the present invention is particularly useful for preparation of an optical functional layer of a liquid crystal compound or the like having a difficulty in improving cissing, surface condition, and alignment.

EXPLANATION OF REFERENCES

10: optical film
11: support
12: λ/4 layer
13, 14: liquid crystal layer
20: liquid crystal display device
21: upper side polarizing plate
23: upper electrode substrate
25: liquid crystal
26: lower electrode substrate
28: lower side polarizing plate
30: liquid crystal cell
40: backlight unit
41: reflection plate
42: light source
43: light guide plate
44: wavelength conversion member
45: luminance improving film

What is claimed is:

1. An optical film comprising:
a cholesteric liquid crystal layer containing a composition for preparing an optical functional layer on a support,
wherein the composition for preparing an optical functional layer comprises:
a liquid crystal compound; and
a copolymer,
wherein the copolymer includes a constitutional unit corresponding to a fluoroaliphatic group-containing monomer represented by Formula I, and a constitutional unit corresponding to a monomer represented by Formula II,

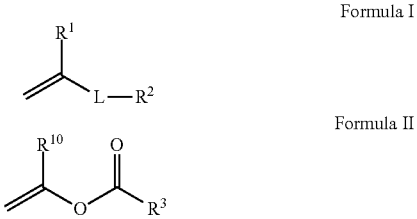

wherein in Formulae I and II, $R^1$, $R^{10}$, and $R^3$ each independently represent a hydrogen atom or an alkyl group having 1 to 20 carbon atoms, $R^2$ represents an alkyl group having 1 to 20 carbon atoms in which at least one carbon atom has a fluorine atom as a substituent, and L represents a divalent linking group constituted by at least one selected from the group consisting of —O—, —(C=O)O—, —O(C=O)—, a divalent chain group, and a divalent aliphatic cyclic group, wherein the cholesteric liquid crystal layer is formed by laminating a plurality of layers, and wherein the plurality of cholesteric liquid crystal layers has a cholesteric liquid crystal layer including a rod-like liquid crystal compound and a cholesteric liquid crystal layer including a disk-like liquid crystal compound.

2. The optical film according to claim 1,
wherein the fluoroaliphatic group-containing monomer represented by Formula I is a monomer represented by Formula III,

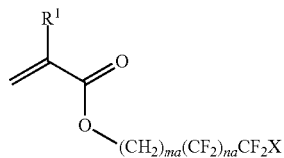

Formula III in Formula III, $R^1$ represents a hydrogen atom or an alkyl group having 1 to 20 carbon atoms, ma and na each independently represent an integer of 1 to 10, and X represents a hydrogen atom or a fluorine atom.

3. The optical film according to claim 2,
wherein in Formula III, ma is an integer of 1 or 2, and na is an integer of 1 to 6.

4. The optical film according to claim 1,
wherein in Formula II, $R^3$ is a methyl group, an ethyl group, a propyl group, a t-butyl group, or a n-butyl group.

5. The optical film according to claim 1,
wherein the liquid crystal compound is a polymerizable liquid crystal compound.

6. The optical film according to claim 5,
wherein the polymerizable liquid crystal compound is at least one of a polymerizable rod-like liquid crystal compound or a polymerizable disk-like liquid crystal compound.

7. The optical film according to claim 1,
wherein the cholesteric liquid crystal layer including the rod-like liquid crystal compound and the cholesteric liquid crystal layer including the disk-like liquid crystal compound are in contact with each other.

8. A liquid crystal display device comprising at least:
a backlight unit including the optical film according to claim 1; and
a liquid crystal cell.

9. The optical film according to claim 1,
wherein $R^1$ represents a hydrogen atom or a methyl group.

10. The liquid crystal display device according to claim 8,
wherein $R^1$ represents a hydrogen atom or a methyl group.

* * * * *